US010073193B2

(12) United States Patent
Hongo et al.

(10) Patent No.: US 10,073,193 B2
(45) Date of Patent: Sep. 11, 2018

(54) OPTICAL ELEMENT

(71) Applicant: Oji Holdings Corporation, Tokyo (JP)

(72) Inventors: Koki Hongo, Tokyo (JP); Kei Shinotsuka, Tokyo (JP); Kotaro Dai, Tokyo (JP); Keiichi Kajita, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 0 days.

(21) Appl. No.: 15/322,982

(22) PCT Filed: Jun. 30, 2015

(86) PCT No.: PCT/JP2015/068814
§ 371 (c)(1),
(2) Date: Dec. 29, 2016

(87) PCT Pub. No.: WO2016/009826
PCT Pub. Date: Jan. 21, 2016

(65) Prior Publication Data
US 2017/0146696 A1 May 25, 2017

(30) Foreign Application Priority Data

Jul. 15, 2014 (JP) .................................. 2014-144989
Apr. 7, 2015 (JP) .................................. 2015-078526

(51) Int. Cl.
*G02B 27/00* (2006.01)
*G02B 1/11* (2015.01)
(Continued)

(52) U.S. Cl.
CPC ................ *G02B 1/11* (2013.01); *G02B 1/118* (2013.01); *G02B 5/0231* (2013.01); *G02B 27/0018* (2013.01)

(58) Field of Classification Search
CPC ........ G02B 5/02; G02B 5/0205; G02B 5/021; G02B 5/0215; G02B 5/0221;
(Continued)

(56) References Cited

U.S. PATENT DOCUMENTS

2007/0116934 A1    5/2007  Miller
2009/0244713 A1 * 10/2009  Kodera ................ G02B 3/0025
                                                           359/619
(Continued)

FOREIGN PATENT DOCUMENTS

CN          101088030 A       12/2007
JP         A-2005-173120        6/2005
(Continued)

OTHER PUBLICATIONS

International Search Report in International Application No. PCT/JP2015/068814, dated Sep. 29, 2015.
(Continued)

*Primary Examiner* — Thong Nguyen
(74) *Attorney, Agent, or Firm* — Knobbe, Martens, Olson & Bear, LLP

(57) ABSTRACT

An optical element including, on a substrate, an anti-reflection layer on multiple small concave protrusions, which have a modal pitch less than or equal to a wavelength of light in an environment where the optical element is to be used, are formed; in which 80% or more of the concave protrusions include one or more steps, and satisfy the following conditions: $0.12d \leq w_s \leq 0.17d$ and $0.42h \leq z_s \leq 0.52h$, in which d is a diameter of the concave protrusions, h is a depth of the concave protrusions, $w_s$ is a total width of the steps in any cut surface; and $z_s$ is an average depth of the steps.

5 Claims, 16 Drawing Sheets

(51) Int. Cl.
*G02B 5/02* (2006.01)
*G02B 1/118* (2015.01)
(58) Field of Classification Search
CPC .. G02B 5/0231; G02B 5/0273; G02B 5/0294; G02B 1/11; G02B 1/118; G02B 27/00; G02B 27/0018
See application file for complete search history.

(56) References Cited

U.S. PATENT DOCUMENTS

| | | | |
|---|---|---|---|
| 2011/0235181 A1* | 9/2011 | Hayashibe | G02B 1/118 359/577 |
| 2012/0026591 A1* | 2/2012 | Hayashibe | B82Y 20/00 359/601 |
| 2015/0221824 A1* | 8/2015 | Hatta | H01L 21/0237 257/98 |

FOREIGN PATENT DOCUMENTS

| | | |
|---|---|---|
| JP | A-2005-331868 | 12/2005 |
| JP | A-2010-079200 | 4/2010 |
| JP | A-2010-156844 | 7/2010 |
| JP | A-2011-107195 | 6/2011 |

OTHER PUBLICATIONS

Extended Search Report in European Patent Application No. 15822124.2, dated Feb. 6, 2018.

* cited by examiner

FIG. 16

OPTICAL ELEMENT

TECHNICAL FIELD

The present invention relates to an optical element.

The present application claims priority to Japanese Patent Application No. 2014-144989, filed on Jul. 15, 2014, and Japanese Patent Application No. 2015-078526, filed on Apr. 7, 2015, the contents of which are incorporated by reference herein.

BACKGROUND ART

Often, a film-like anti-reflection structure for improving visibility is provided on the surface of a display, for example, a computer or the like. A method for preventing reflection by closely disposing a plurality of fine convex protrusions on the surface of a transparent substrate (transparent film) has been proposed as this anti-reflection structure. The so-called "moth-eye structure" principle is applied in this method. Moth-eye structures seek to prevent reflection by continuously varying the refractive index with respect to incident light in a thickness direction of the substrate, thereby sudden fluctuations in refractive index at the interfaces are eliminated and anti-reflectivity is obtained.

Such an optical element can realize high antireflective performance, provided that the refractive index with respect to incident light can be continuously varied. As such, in principle, anti-reflection structures are not limited to fine convex protrusions and may also be fine concave protrusions. It is preferable that a ratio of height or depth of the fine convex protrusions or concave protrusions to a width of the structure (hereinafter referred to as the "aspect ratio") be great. This is because when the aspect ratio is great, the refraction index changes will be gradual and high antireflective performance can be obtained. On the other hand, with larger aspect ratios, stability of the anti-reflection structure provided with the convexity or concave protrusion structure is lost. Thus, there is a problem in that it is difficult to maintain the shape of the structure. There is also a problem in that larger aspect ratios lead to increased complications when fabricating the structure. For example, these types of fine shapes can be fabricated by nanoimprinting or other methods in which a mold is used. However, there is a problem in that, when the aspect ratio is high, the mold becomes clogged with resin or the like when transferring the convex protrusions or concave protrusions from the mold.

As such, many lines of research are being pursued to obtain high antireflective performance without increasing the aspect ratio. For example, Patent Literature 1 describes improving the antireflective performance of an optical element by providing two or more steps in convex protrusions or concave protrusions. If two or more steps are provided in the convex protrusions or concave protrusions, discontinuous interfaces will occur in the interfaces where the refractive index of the moth-eye structure continuously varies. These discontinuous interfaces reflect a portion of the incident light. Patent Literature 1 suggests that the reflected light can be reduced by causing the light reflected at the discontinuous interfaces to interfere with each other. However, the optical element described in Patent Literature 1 has not provided sufficient antireflective performance.

CITATION LIST

Patent Literature

Patent Literature 1: Japanese Unexamined Patent Application Publication No. 2010-79200A

SUMMARY OF INVENTION

Technical Problem

When attempting to obtain high antireflective performance, the frequency at which reflected light interferes must be increased and, to do so, more steps must be formed in the convex protrusions or the concave protrusions. However, fabricating convex protrusions or concave protrusions with many steps requires a complex process and, consequently, fabrication has been difficult.

In light of these problems, an object of the present invention is to provide an optical element with high antireflective performance and which can be easily manufactured.

Solution to Problem

In order to solve the problems described above, the present inventors focused on the width of steps and the position of steps of concave protrusions formed in an anti-reflection layer.

As a result, the present inventors discovered that it is preferable that the width and the position of the steps of the concave protrusions be provided in predetermined ranges.

The present invention includes the following inventions:

[1] An optical element comprising:
on a substrate, an anti-reflection layer in which a plurality of small concave protrusions, which have a modal pitch, wherein the modal pitch P is a distance between adjacent concave protrusions obtained by a reciprocal of a distance from the zero-order peak to the first-order peak in the profile of the FFT image, and modal pitch is less than or equal to a wavelength of light in an environment where the optical element is to be used, are formed; wherein 80% or more of the concave protrusions include one or more steps, and satisfy the following conditions:

[Formula 1]

$$0.12d \leq w_s \leq 0.17d \quad (1)$$

[Formula 2]

$$0.42h \leq z_s \leq 0.52h \quad (2)$$

wherein d is a maximum diameter of the concave protrusions observed in any cross-section including 30 to 40 or more concave protrusions, h is a difference in height between the deepest point and the highest portion of the concave protrusions observed in the cross-section including 30 to 40 or more concave protrusions, Ws is a total width of the steps in any cut surface; and Zs is an average depth of the steps.

[2] An optical element comprising:
on a substrate, an anti-reflection layer in which a plurality of small concave protrusions, which have a modal pitch less than or equal to a wavelength of light in an environment where the optical element is to be used, are formed; wherein 80% or more of the concave protrusions include two or fewer steps, and satisfy the following conditions:

[Formula 3]

$$0.10d \leq w_s \leq 0.20d \quad (3)$$

[Formula 4]

$$0.44h \leq z_s \leq 0.56h \quad (2)$$

wherein d is a maximum diameter of the concave protrusions observed in any cross-section including 30 to 40 or more concave protrusions, h is a difference in height between the deepest point and the highest portion of the concave protrusions observed in the cross-section including 30 to 40 or more concave protrusions, Ws is a total width of the steps in any cut surface; and Zs is an average depth of the steps.

[3] An optical element comprising:

on a substrate, an anti-reflection layer in which a plurality of small concave protrusions, which have a modal pitch less than or equal to a wavelength of light in an environment where the optical element is to be used, are formed; wherein 80% or more of the concave protrusions include one step, and satisfy the following conditions:

[Formula 5]

$$0.09d \leq w_s \leq 0.15d \quad (5)$$

[Formula 6]

$$0.44h \leq z_s \leq 0.56h \quad (4)$$

wherein d is a maximum diameter of the concave protrusions observed in any cross-section including 30 to 40 or more concave protrusions, h is a difference in height between the deepest point and the highest portion of the concave protrusions observed in the cross-section including 30 to 40 or more concave protrusions, Ws is a total width of the steps in any cut surface; and Zs is an average depth of the steps.

[4] The optical element according to anyone of [1] to [3], wherein:

a modal depth which is the average depth of 30 to 40 or more concave protrusions in the cross-section including 30 to 40 or more concave protrusions is in a range of 45% to 55% of a median of a wavelength range of light in an environment where the optical element is to be used.

[5] The optical element according to anyone of [1] to [4], wherein:

an envelope of the concave protrusions including the step is conical.

[6] The optical element according to anyone of [1] to [5], further comprising:

a plurality of areas in which the central points of seven adjacent concave protrusions are hexagonally aligned continuously in a positional relationship so as to become six vertices and the intersection point of the diagonal lines of a regular hexagon, and an area, shape, and lattice orientation of said plurality of areas are randomly selected.

Advantageous Effects of Invention

The optical element of the present invention includes, on a substrate, an anti-reflection layer in which small concave protrusions are formed, and the concave protrusions include steps of a predetermined width and at predetermined positions. Thus, high antireflective performance is obtained. The number of steps can be reduced due to the steps having the predetermined width and being at the predetermined position. As such, the optical element of the present invention can be manufactured easier.

BRIEF DESCRIPTION OF DRAWINGS

FIG. 13 is a table showing the average reflectance at an angle of incidence of 5° that was calculated while changing the total width $w_s$ of the steps and the average depth $z_s$ of the steps when using concave protrusions that include one step.

FIG. 14 is a table showing the average reflectance at an angle of incidence of 5° that was calculated while changing the total width $w_s$ of the steps and the average depth $z_s$ of the steps when using concave protrusions that include two steps.

FIG. 15 is a table showing the average reflectance at an angle of incidence of 5° that was calculated while changing the total width $w_s$ of the steps and the average depth $z_s$ of the steps when using concave protrusions that include three steps.

FIG. 16 is a table wherein rows are proportions of the width $d_{3/4}$ of the concave protrusions at a depth of ¾ h from the reference plane including the reference point, with respect to the diameter d of the concave protrusions. Additionally, the modal pitch P of the concave protrusions was 90 nm and the diameter d was 90 nm (average).

DESCRIPTION OF EMBODIMENTS

Figure 1:
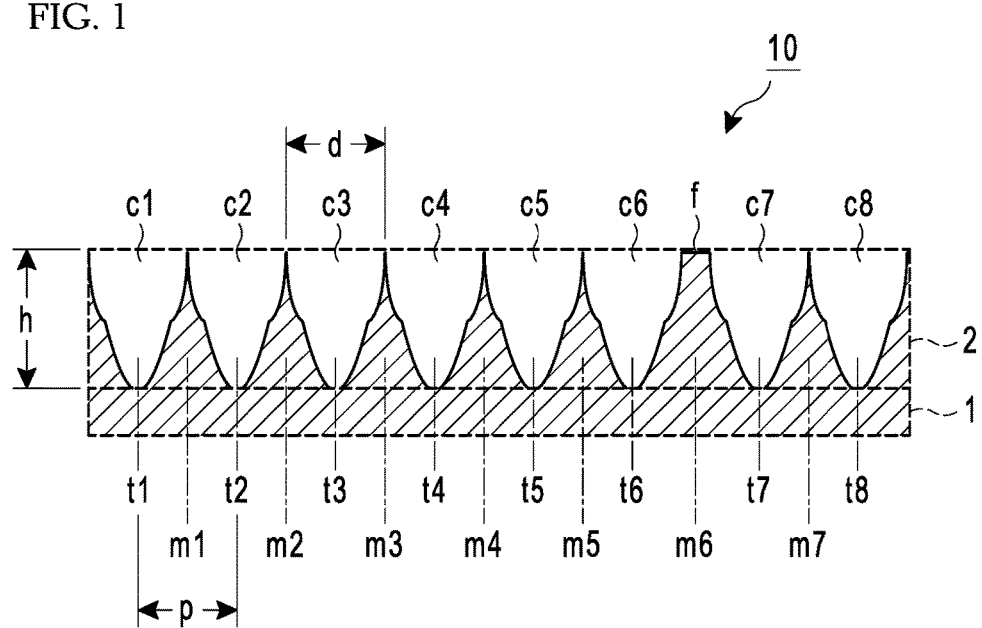
FIG. 1 is a cross-sectional view schematically illustrating an optical element of the present invention.
Figure 2:
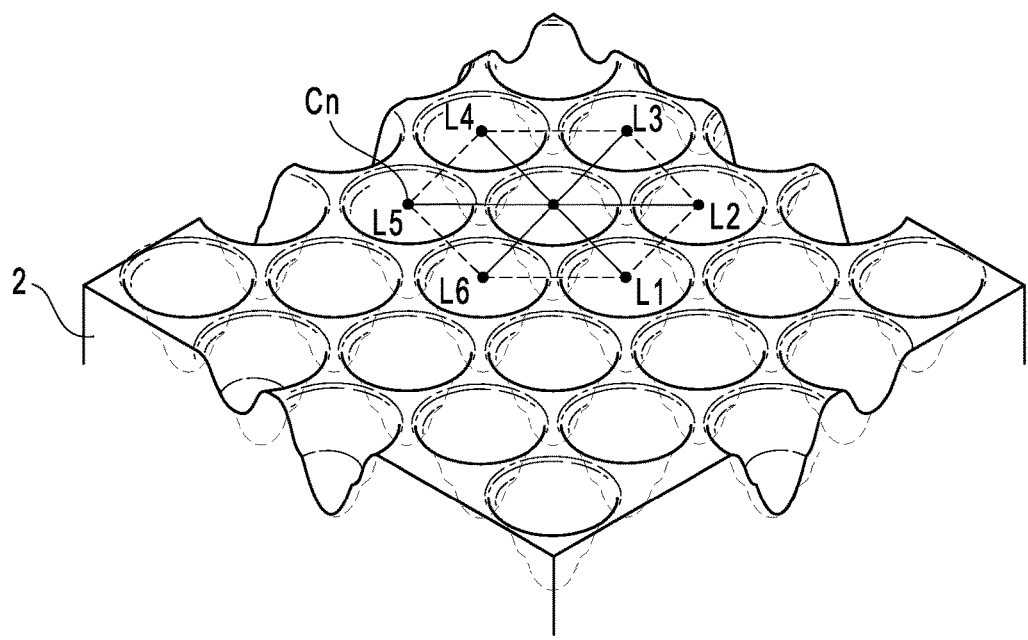
FIG. 2 is a perspective view schematically illustrating the optical element of the present invention.
Figure 3:
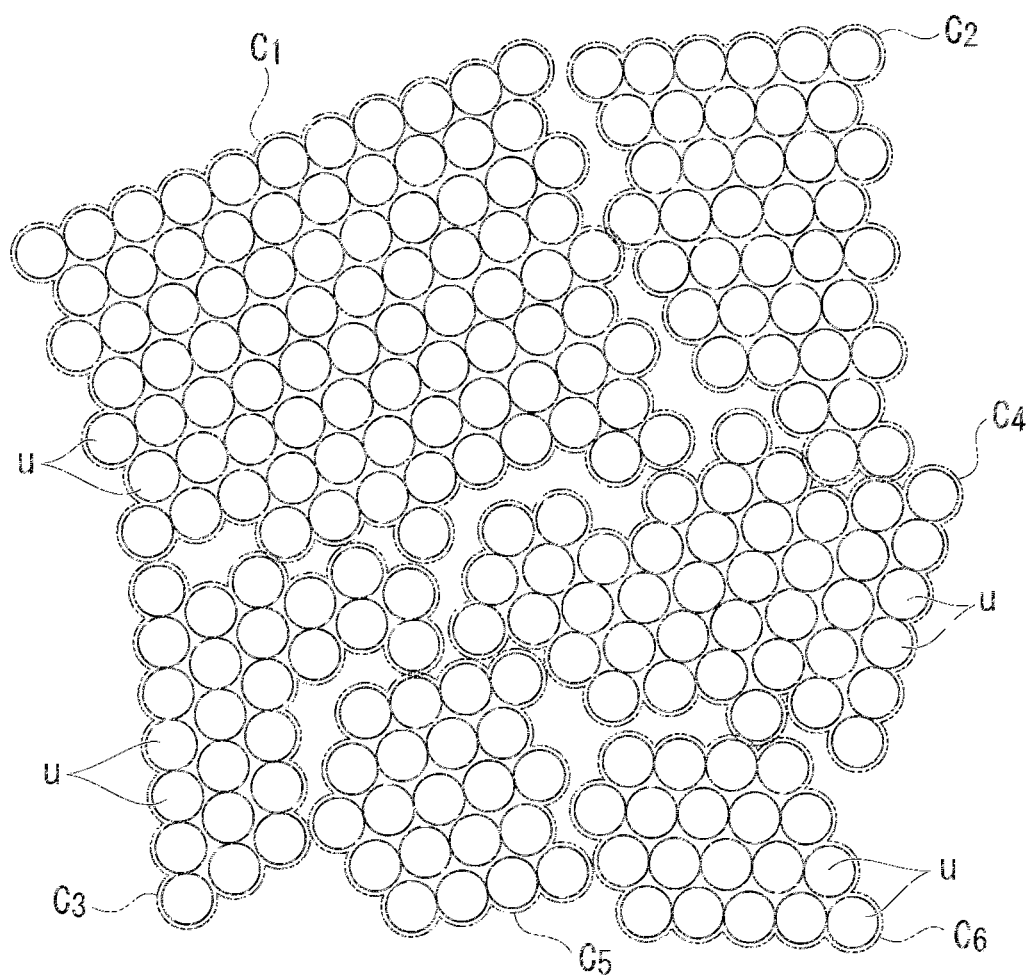
FIG. 3 is a plan view schematically illustrating the optical element of the present invention.

FIG. 1 is a cross-sectional view schematically illustrating an optical element of the present invention. FIG. 2 is a perspective view schematically illustrating the optical element of the present invention. FIG. 3 is a plan view schematically illustrating the optical element of the present invention. An optical element 10 is provided with, on a substrate 1, an anti-reflection layer 2 in which a plurality of small concave protrusions c1 to cn, which have a modal pitch P less than or equal to a wavelength of light in an environment where the optical element is to be used, are formed. The optical element 10 may include a flat portion f between the concave protrusions c1 to cn.

In FIG. 1, t1 to tn are central points of the concave protrusions c1 to cn. The center of gravity of each contour line (point determined by an X-coordinate and a Y-coordinate) is found by drawing a plurality of contour lines parallel to a reference plane for each of the concave protrusions at 20 nm intervals, on the basis of the result of measurements by an AFM (atomic force microscope). An average position of the centers of gravity (place determined by the average of the X-coordinates and the average of the Y-coordinates) is the central point of the concave protrusion.

In FIG. 1, m1 to mn are midpoints between adjacent central points, found using the AFM. The flat portion f is a region where, on the basis of the results of measurements by AFM, a slope of a straight line connecting a positional coordinate at the midpoint in the region with a positional coordinate of any point in the region, with respect to a reference plane of the AFM, is ±10° or less. The reference plane is a plane that is parallel with a reference plane in the measurement region and is a plane that passes through a reference point (described later).

The modal pitch P is a distance between adjacent concave protrusions and, specifically, can be found as follows.

First, in a randomly selected region on the substrate 1, an AFM image is obtained for a square region of which one side thereof is from 30 to 40 times the modal pitch P. For example, in a case where the modal pitch P is about 300 nm, an image of a 9 μm×9 μm to 12 μm×12 μm region is obtained. Then, this image is subjected to waveform separation by Fourier transformation to obtain a fast Fourier transform image (FFT image). Next, the distance from the zero-order peak to the first-order peak in the profile of the FFT image is determined.

The reciprocal of the distance thus determined is the modal pitch P in that region. This process is performed in the same manner for not less than a total of 25 randomly selected regions of the same area, and the modal pitch in each region is determined. The average of the modal pitches $P_1$ to $P_{25}$ of the not less than 25 regions obtained in this manner is the modal pitch P. Note that, at this time, it is preferable that regions that are at least 1 mm apart are selected, and it is more preferable that regions that are from 5 mm to 1 cm apart from each other are selected.

As illustrated in FIG. 3, the concave protrusions c1 to cn may be divided into a plurality of areas $C_1$ to $C_n$.

The areas $C_1$ to $C_n$ are regions continuously arranged in a positional relationship in which the central point of seven adjacent concave protrusions is an intersection point of diagonal lines of six vertices of a regular hexagon. Note that in FIG. 3, for convenience, the position of the central point of each concave protrusion is indicated by a circle u centered on that central point.

In the present invention, the positional relationship a positional relationship so that the central points of the seven adjacent concave protrusions are to become six vertices and intersection point of diagonal lines of a regular hexagon refers to a relationship that satisfies the following conditions.

First, a line segment L1 of a length equal to the modal pitch P is drawn from one central point t1 toward an adjacent central point t2. Then, line segments L2 to L6 of lengths equal to the modal pitch P are drawn from the central point t1 in directions 60°, 120°, 180°, 240°, and 300° with respect to the line segment L1. When each of six central points adjacent to the central point t1 is within a range of 15% of each modal pitch P from the end point of each of the line segments L1 to L6 on the side opposite the central point t1, the central points of these seven convex protrusions are in a positional relationship where the central point t1 is an intersection point of the diagonal lines of six vertices of a regular hexagon.

A modal area Q of the areas $C_1$ to $C_n$ (the mode of the area size) is preferably in the following range.

When the modal pitch P is less than 500 nm, the modal area Q within a 10 μm×10 μm AFM image measurement range is preferably from 0.026 μm² to 6.5 μm².

When the modal pitch P is not less than 500 nm and less than 1 μm, the modal area Q within a 10 μm×10 μm AFM image measurement range is preferably from 0.65 μm² to 26 μm².

When the modal pitch P is not less than 1 μm, the modal area Q within a 50 μm×50 μm AFM image measurement range is preferably from 2.6 μm² to 650 μm².

When the modal area Q is within the preferred range, it is easier to prevent the problem of viewing angle dependence on antireflective performance.

As illustrated in FIG. 3, areas, shapes, and crystal orientations of the areas $C_1$ to $C_n$ are random.

Specifically, the degree of randomness of the area preferably satisfies the following conditions.

First, an ellipse of the maximum area circumscribed by the boundary line of one area is drawn, and that ellipse is represented by Formula (7) below:

[Formula 7]

$$X^2/a^2 + Y^2/b^2 = 1 \qquad (7).$$

When the modal pitch P is less than 500 nm, the standard deviation of πab within a 10 μm×10 μm AFM image measurement range is preferably not less than 0.08 μm².

When the modal pitch P is not less than 500 nm and less than 1 μm, the standard deviation of πab within a 10 μm×10 μm AFM image measurement range is preferably not less than 1.95 μm².

When the modal pitch P is not less than 1 μm, the standard deviation of πab within a 50 μm×50 μm AFM image measurement range is preferably not less than 8.58 μm².

When the standard deviation of πab is within the preferred range, it is easier to prevent the problem of viewing angle dependence on antireflective performance.

As for the degree of randomness of shape of the areas $C_1$ to $C_n$, specifically, the standard deviation of the ratio of a to b (a/b) in Formula (7) above is preferably not less than 0.1.

Specifically, the randomness of the crystal orientation of the areas $C_1$ to $C_n$ preferably satisfies the following conditions.

First, a straight line K0 is drawn connecting the central points of any two adjacent concave protrusions in any area (I). Then, one area (II) adjacent to the area (I) is chosen, and six straight lines K1 to K6 are drawn connecting any concave protrusion in the area (II) and the central points of six concave protrusions adjacent to that concave protrusion. The crystal orientations of the area (I) and the area (II) are defined as being different when all of the lines K1 to K6 are at an angle of not less than 3 degrees with respect to the straight line K0.

Among the areas adjacent to the area (I), there are preferably not less than two areas having a different crystal orientation than the area (I), and more preferably not less than three such areas, and even more preferably not less than five such areas.

The crystal orientations of the concave protrusions c1 to cn are ordered within the areas $C_1$ to $C_n$, but, macroscopically, the concave protrusions c1 to cn are random polycrystalline structures. The macroscopic randomness of the crystal orientations can be evaluated using a ratio of the maximum value to the minimum value of the Fast Fourier Transform (FFT) fundamental wave. The ratio of the maximum value to the minimum value of the FFT fundamental wave is found by acquiring an AFM, image, finding the two-dimensional Fourier Transform image of the AFM image, drawing a circumference distanced from an origin point the number of fundamental waves, extracting the point of greatest amplitude and the point of least amplitude on this circumference, and taking the ratio of these amplitudes. The method for acquiring the AFM image is the same as the method for acquiring the AFM image when finding the modal pitch P.

In cases where the ratio of the maximum value to the minimum value of the FFT fundamental wave is large, the crystal orientations of the concave protrusions are ordered and, when the concave protrusions are viewed as two-dimensional crystals, it can be said that the structure is highly monocrystalline. Conversely, in cases where the ratio of the maximum value to the minimum value of the FFT fundamental wave is small, the crystal orientations of the concave protrusions are random and, when the concave protrusions are viewed as two-dimensional crystals, it can be said that the structure is polycrystalline.

When the concave protrusions c1 to cn have the ratio of the maximum value to the minimum value of the FFT fundamental wave in the preferable range described above, the reflected light that has reflected at the step surfaces does not reflect in a specific in-plane direction, but instead reflects evenly. As such, in-plane reflection intensity does not change depending on, the viewing angle. In other words, antireflective performance with low dependence on the viewing angle can be obtained.

80% or more of the concave protrusions c1 to cn include one or more steps, and satisfy the following conditions. Here, d is a diameter of the concave protrusions, h is a depth of the concave protrusions, $w_s$ is a total width of the steps in any cut surface; and $z_s$ is an average depth of the steps.

[Formula 8]

$$0.12d \leq w_s \leq 0.17d \quad (1)$$

[Formula 9]

$$0.42h \leq z_s \leq 0.52h \quad (2)$$

When the width and the depth of the steps are within the ranges described above, higher antireflective performance will be displayed compared to a stepless optical element. When the width and the depth of the steps are within the ranges described above, high antireflective performance can be obtained even with three or fewer steps, and a desired optical element can be easily fabricated.

The proportion of concave protrusions that include steps is determined as follows. A cross-section along a line having a length of 5 μm in any direction and at any position such as that illustrated in FIG. 1 is obtained from an AFM image. The cross-section such as that illustrated in FIG. 1 may be obtained as a photomicrograph that was acquired by observing, using a microscope, a cross-section of a cut sample taken from the optical element. In cases where there is a possibility that the cross-sectional shape of the optical element will change as a result of the cutting, it is preferable that the concave protrusion surface be covered or filled with a material capable of enduring the cutting, and then the optical element be cut. In cases where both a cross-section measured using an AFM image and a cross-section observed using a microscope image exist, the cross-section measured using an AFM image is given priority. This is because with the cross-section measured using an AFM image, it is easier to obtain a measurement surface of the cut surface that passes through the deepest portion of the concave protrusions, and it is easier to confirm the relationship between the width and the depth of the steps. The cross-section is any plane perpendicular to the arrangement plane on which the concave protrusions are arranged. In cases where the concave protrusions are regularly arranged, it is preferable that the direction corresponding to the arrangement direction of the concave protrusions is used as the cutting direction in which the cross-section is obtained.

In cases where it is difficult to confirm the shape of the concave protrusions, the shape (including the depth and step positions) of the concave protrusions may be confirmed by using the optical element as a mold and confirming the shape of convex protrusions on an transfer product obtained as a result of inverting/transferring the concave protrusions. In this case, a cross-section of the transfer product may be measured using an AFM image, or a cut surface thereof may be directly observed using a microscope. From the perspective of obtaining a cut surface that passes through the apexes of the transfer product, it is preferable that the cut surface be measured using an AFM image.

Any portion of the cross-section in which 30 to 40 or more concave protrusions are included is extracted, and the proportion of concave protrusions that include steps is calculated for the concave protrusions included in the extracted portion.

The diameter d can be found as a maximum diameter of the concave protrusions observed in a cross-section perpendicular to the arrangement plane of the concave protrusions.

The depth h can be obtained by calculating the difference in height between the deepest point and the highest portion (the portion farthest away from the deepest point in the cut surface; hereinafter referred to as the "reference point") of the concave protrusions observed in the cross-section perpendicular to the arrangement plane of the concave protrusions.

The steps, the width of the steps, and the depth of the steps are defined below.

First, steps are set according to the following procedures. In some cases, in the shape of the envelope, the concave protrusions c1 to cn include fine unevennesses of a degree that can be ignored from the standpoint of the operations and effects. Herein, the steps are set ignoring such fine unevennesses. Specifically, changes, with respect to a fitting curve, of 3% or less of the depth h of the concave protrusions c1 to cn are ignored.

a. Inflection points, in the broad sense, are found.
    b. Tangents to each of the inflection points are drawn.
    c. Points nearest to intersection points of the tangents are defined as changing points.
    d. The changing points are connected by straight lines. As there is no subsequent changing point for the changing point nearest to the deepest point, a tangent at that changing point is drawn. The straight lines obtained in this manner are defined as a first straight line, a second straight line, and so on in order from the straight line near the reference point (the highest portion of the concave protrusion cross-section).
    e. In cases where the absolute value of the slope of an nth straight line among the straight lines is less than or equal to the absolute values of the slope of the n−1th straight line and the slope of the n+1th straight line, this section of the nth straight line is defined as a "step".

The procedures of a to e above will be explained using FIGS. 4A to 4D FIGS. 4A to 4D are schematic drawings for explaining the definition of the steps.

First, as procedure a, inflection points, in the broad sense, are defined. Mathematically, an inflection point is a point where a curve on a plane changes from being convex upward to being convex downward or vice versa. In addition to this definition, in the present invention, a reference point and a non-differentiable point are considered to be inflection points, in the broad sense of the term. Due to the relationship of the definition of the tangent to the inflection point (described later), for descriptive purposes, the curve is considered to have two inflection points at the non-differentiable point. These two inflection points are, specifically, a point infinitely close to a point where the curve bends from, the reference point side, and a point infinitely close to a point where the curve bends from the deepest point side. The inflection points are numbered in order from that nearest to the reference point, and are defined as a first inflection point to an nth inflection point.

Figure 4A:
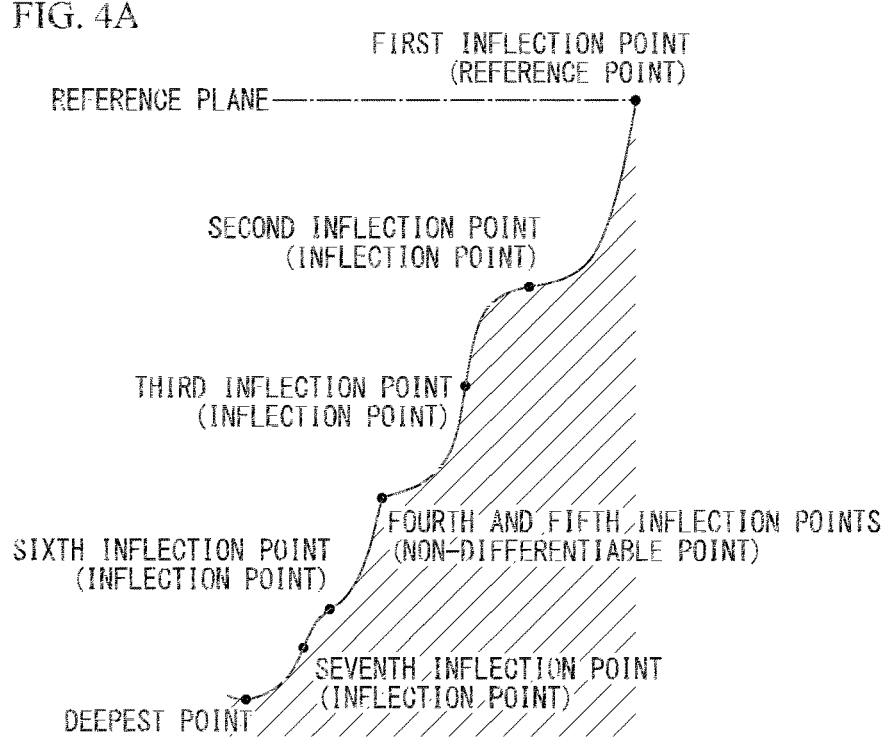
FIG. 4A is a schematic drawing for explaining a definition of the steps.

The method for finding the inflection points in the broad sense is specifically illustrated in FIG. 4A. In FIG. 4A, when confirming the order from the reference point of the concave protrusion, the reference point is the first inflection point. The points where the concavo-convex direction of the curve subsequently changes are the second inflection point and the third inflection point, in order from the point nearest to the reference point. Furthermore, the point where the curve bends (that is, the non-differentiable point) is the fourth inflection point and the fifth inflection point. Lastly, as with the second inflection point and the third inflection point, the points where the concavo-convex direction of the curve changes are the sixth inflection point and the seventh inflection point, in order from the point nearest to the reference point.

Figure 4B:
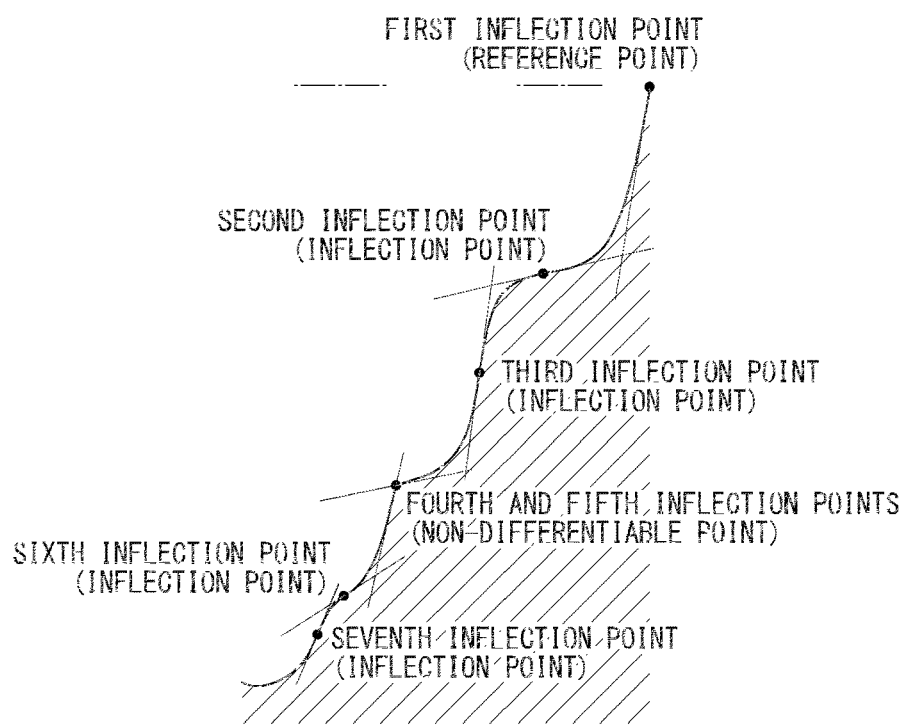
FIG. 4B is a schematic drawing for explaining the definition of the steps.

Next, as procedure b, tangents are drawn at each of the inflection points. It is mathematically impossible to draw a tangent for the non-differentiable point. However, for descriptive purposes, the inflection points are set as the two points, namely a point infinitely close to the point where the curve bends from the reference point side, and a point infinitely close to the point where the curve bends from the deepest point side. As such, a tangent is drawn at each of these two points. The tangents drawn at the two points specifically are a straight line having a slope immediately prior to the curve bending from the reference point side toward the deepest point side and a straight line having a slope immediately after the curve bends from the reference point side toward the deepest point side. As such, these two tangents can be drawn as illustrated in FIG. 4B. As illustrated in FIG. 4B, it is mathematically possible to draw tangents at the other inflection points.

Figure 4C:
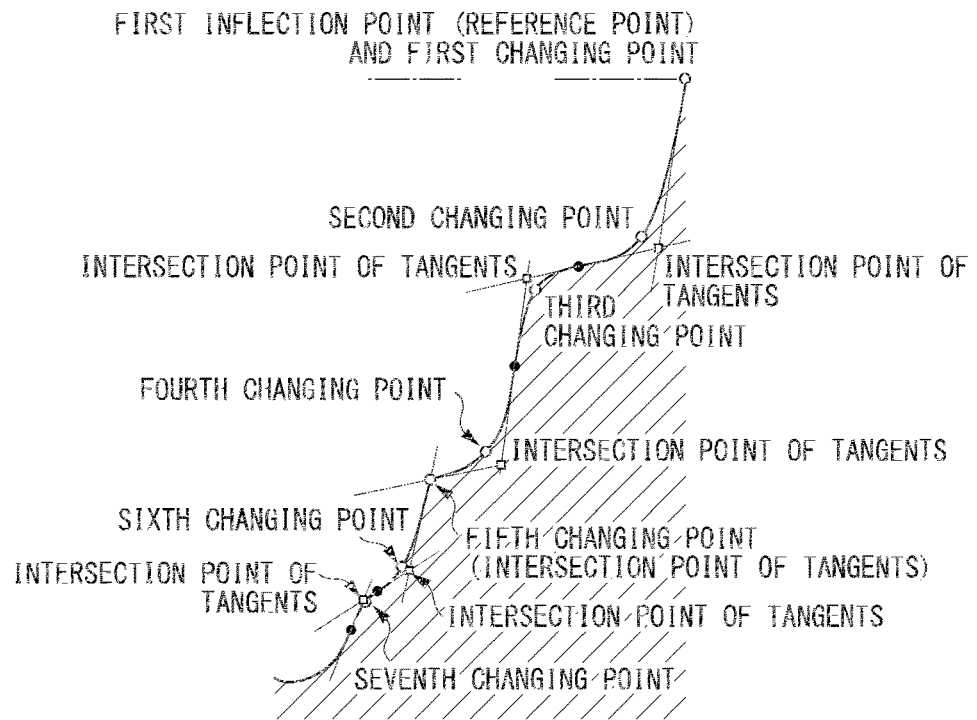
FIG. 4C is a schematic drawing for explaining the definition of the steps.

As illustrated in FIG. 4C, points on the curve nearest to intersection points of the tangents drawn in the manner described above are defined as changing points (procedure c). Regarding the non-differentiable point, the two tangents described above are drawn, which results in the intersection point being the non-differentiable point. Accordingly, the non-differentiable point is one of the changing points. Additionally, the reference point is also a changing point because it is the origin point of the concave protrusion. In FIG. 4C, for descriptive purposes, the changing points are numbered in order from the side near the reference point.

Figure 4D:
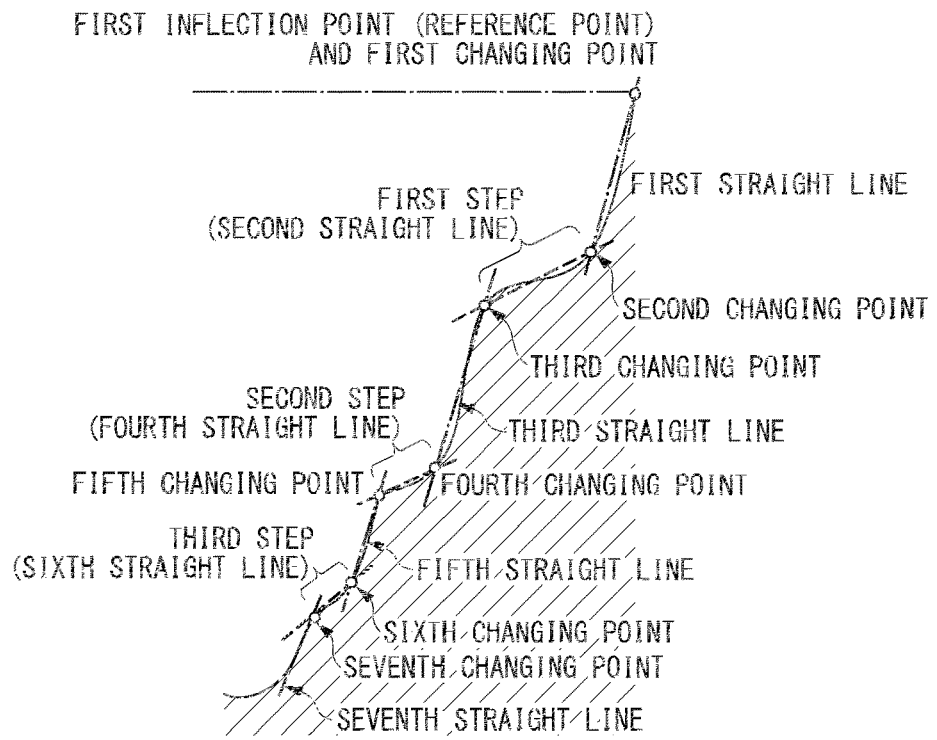
FIG. 4D is a schematic drawing for explaining the definition of the steps.

Next, as procedure d, the changing points are connected by straight lines. As illustrated in FIG. 4D, the changing point (seventh changing point) nearest to the deepest point does not have a subsequent changing point on the deepest point side to which the straight line can be connected. As such, a tangent is drawn at the changing point nearest to the deepest point. The straight lines drawn in this manner are numbered in order front the reference point side. In FIG. 4D, a first straight line to a seventh straight line can be drawn.

In cases where the absolute value of the slope of an nth straight line among the straight lines satisfies the relationship of being less than or equal to the absolute value of the slope of the n−1th straight line and the absolute value of the slope of the n+1th straight line, this section of the nth straight line is defined as a "step" (procedure e). Referring to FIG. 4D, the slope of the second straight line, for example, is less than or equal to the absolute values of the slope of the first straight line and the slope of the third straight line and, therefore, is a step. The same is true for the fourth straight line and the sixth straight line.

Next, the width of the steps and the depth of the steps will be described.

Figure 5:
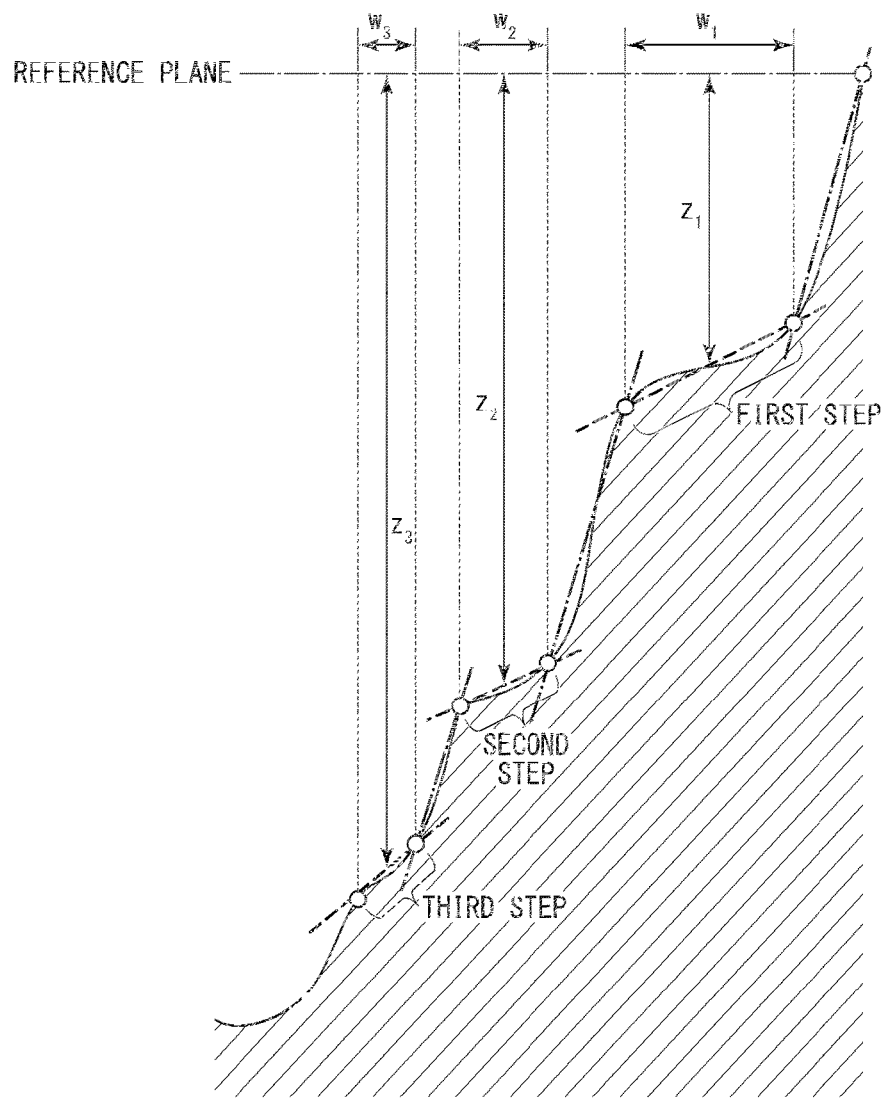
FIG. 5 is a cross-sectional schematic drawing for explaining definitions of a width of the steps and a depth of the steps.

As illustrated in FIG. 5, the term "width of the steps" means a width of the steps as defined above, projected on a reference plane of the concave protrusion. That is, in FIG. 5, the width of the first step is $w_1$. A total width of the steps is the total of the widths of each of the steps, and the total width $w_s$ of the steps is a value two-times $w_1+w_2+w_3$. The reason for multiplying by two is because the steps are formed equally in the circumferential direction of the concave protrusion, at the same depths. That is, in FIG. 5, only the steps between one reference point and the deepest point are illustrated, but when cutting any cross-section that passes through the deepest point of the concave protrusion, there are steps in the space from one reference point to the deepest point and also in the space from the deepest point to another reference point. Therefore, the total width of the steps is multiplied by two.

The term "depth of the steps" means the depth from the reference plane, including the reference point, to a midpoint of the step. That is, for example, the depth of the first step as defined in FIG. 4D is $z_1$. An "average depth $z_s$ of the steps" means $(z_1+z_2+z_3)/3$ in FIG. 5. The reason why this value is not divided by 2 like with the width of the steps is because $z_s$ is an average.

It is preferable that 80% or more of the concave protrusions c1 to cn include two or fewer steps, and satisfy the following conditions.

[Formula 10]

$$0.10d \leq w_s \leq 0.20d \qquad (3)$$

[Formula 11]

$$0.44h \leq z_s \leq 0.56h \qquad (4)$$

When within the ranges described above, high antireflective performance can be obtained even with two or fewer steps. In these ranges, higher antireflective performance can be achieved with two or fewer steps than with three or more steps. In other words, the number of steps can be reduced and the optical element can be fabricated more easily.

It is preferable that 80% or more of the concave protrusions c1 to cn include one step, and satisfy the following conditions.

[Formula 12]

$$0.09d \leq w_s \leq 0.15d \qquad (5)$$

[Formula 13]

$$0.44h \leq z_s \leq 0.56h \qquad (6)$$

In these ranges, the highest antireflective performance can be obtained by the concave protrusions with one step, compared to those with a plurality of steps. In other words, the optical element can be fabricated even more easily.

It is preferable that a modal depth of the concave protrusions c1 to cn is in a range of 45% to 55% of a median of a wavelength range of light in the environment where the optical element is to be used. Here, the term "modal depth" means the average depth of 30 to 40 or more concave protrusions in a cross-section such as that of FIG. 1, obtained using AFM or a microscope. By setting the modal depth in this range, higher antireflective performance and higher structural stability can be maintained. If the modal depth of the concave protrusions c1 to cn is excessively less than the median of the wavelength range of light in the environment where the optical element is to be used, continuous variations in the refractive index will become steep and, consequently, the antireflective performance will decline. If the modal depth of the concave protrusions c1 to cn is excessively greater than the median of the wavelength range of light in the environment where the optical element is to be used, the structural stability of the concave protrusions c1 to cn will decline and maintaining the structure will be difficult. If the modal depth of the concave protrusions c1 to cn is excessively greater than the median of the wavelength range of light in the environment where the optical element is to be used, transferring from the mold will be difficult. The phrase "light in the environment where the optical element is to be used" refers to any one of ultraviolet light, visible light, and infrared light. The "median of the wavelength range of light in the environment where the optical element is to be used" is, for example, 580 nm in a case where visible light, specifically light of 380 nm to 780 nm, is used.

It is preferable that the envelope of the concave protrusions c1 to cn is conical. When the envelope of the concave protrusions cn to c1 is conical, the continuous variation of the refractive index becomes gradual at the interface from the higher refractive index and steep at the interface from the lower refractive index and, as a result, higher antireflective performance can be obtained.

From the perspective of increasing anti-reflection effects, it is preferable that the optical element 10 does not include the flat portion f between the concave protrusions.

In cases where the concave protrusions are arranged in a triangular lattice, it is preferable that the optical element 10 has a protrusion in the region surrounded by the three concave protrusions forming the triangular lattice. The protrusion is a portion protruding to the side opposite the substrate, beyond an average reference plane. Here, the term "average reference plane" means a plane that is parallel to the substrate, and that passes through an average point obtained by averaging the heights of the reference points (height in the vertical direction of the substrate) of 30 to 40 or more concave protrusions in a cross-section such as that of FIG. 1, obtained using AFM or a microscope. Likewise, in cases where the concave protrusions are arranged in a square lattice, it is preferable that the optical element 10 has a protrusion in the region surrounded by the four concave protrusions.

It is preferable that a height of the protrusion with respect to the average reference plane is from 3 to 30% of the average depth of the concave protrusions. By configuring the height of the protrusion with respect to the average reference plane to be not less than 3% of the average depth of the concave protrusions, anti-reflection effects can be enhanced further. By configuring the height of the protrusion with respect to the average reference plane to be not greater than 30% of the average depth of the concave protrusions, wear resistance of the optical element surface can be maintained.

The material of the anti-reflection layer 2 is not particularly limited. The material may be an organic or inorganic material. Examples of organic materials that may be used include generally used UV curable resins, thermoplastic resins, thermosetting resins, and the like. Examples of inorganic materials that can be used include Si, $SiO_2$, SiON, Ni, spin on glass, and the like.

The substrate 1 is not particularly limited. Synthetic resins such as polyethylene terephthalate (PET), triacetyl cellulose (TAC), and the like; and inorganic films such as glass, semiconductors, and the like may be used. A flat layer made from the same material as the anti-reflection layer 2 may be used as the substrate 1.

The substrate 1 may be configured in, for example, a film form, a sheet form, a plate form, a block form, or the like. The shape of the substrate 1 is not particularly limited and may be changed depending on the use/application thereof.

The optical element 10 having the concave protrusions c1 to cn described above can be used as an antireflective body to be applied to various types of displays (e.g. LCD displays, plasma displays, rear projectors, FEDs, OLEDs, and other FPDs) of a computer, a mobile phone, a digital camera or the like; and the surfaces of show windows and other glass windows, display frames, various display windows, optical lenses, solar batteries, optical materials from which road/traffic signs and signboards are made, and the like. Additionally, this optical element 10 can be used as an original plate of a nanoimprinting mold for manufacturing such an antireflective body.

Method for Manufacturing the Optical Element

Next, a method for manufacturing the optical element is described. The optical element of the present invention can be obtained by transferring a mold having a predetermined shape an odd number of times. The mold can be fabricated by using an etching mask in which a plurality of particles M are arranged two-dimensionally. FIGS. 6A to 6D are drawings schematically illustrating the method for manufacturing the optical element of the present invention.

Figure 6A:
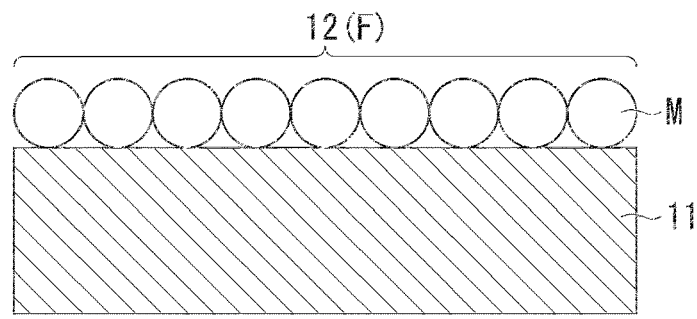
FIG. 6A is a cross-sectional schematic drawing schematically illustrating a method for manufacturing the optical element of the present invention.

First, a a particle monolayer etching mask 12, made from a plurality of particles M, is formed on a mold substrate 11 (FIG. 6A). A method employing, for example, the concept of the Langmuir-Blodgett method (LB method) can be used as the method for forming the a particle monolayer etching mask 12 on the mold substrate 11. Specifically, the a particle monolayer etching mask 12 can be formed on the mold substrate 11 via a method including a dripping step in which a dispersion having particles dispersed in a solvent is dripped on the surface of liquid in a water tank, a a particle monolayer formation step in which a a particle monolayer F made of particles is formed by volatilizing the solvent, and a transfer step in which the a particle monolayer F is transferred onto the substrate.

These steps are described in detail below.

Dripping Step and A Particle Monolayer Formation Step

Figure 7A:
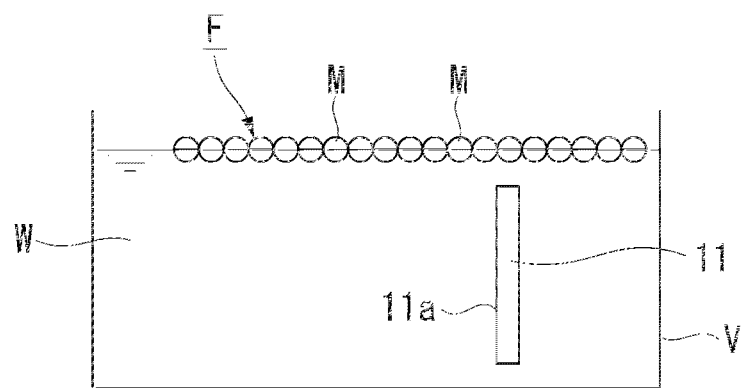
FIG. 7A is a cross-sectional schematic drawing schematically illustrating a transfer step in a method for manufacturing a mold for manufacturing the optical element of the present invention.

First, a dispersion is prepared by adding particles having hydrophobic surfaces to a hydrophobic organic solvent made of one or more types of solvents with high volatility such as chloroform, methanol, ethanol, methyl ethyl, ketone, and the like. Meanwhile, as illustrated in FIG. 7A, a water tank (trough) V is prepared, and a liquid, namely water W for expanding the particles M on the surface thereof (hereinafter sometimes referred to as "lower-layer water"), is filled in the tank.

Then, the dispersion is dripped onto the liquid surface of the lower-layer water (dripping step). By so doing, the solvent that is the dispersion medium volatilizes and the particles expand in a monolayer on the surface of the lower-layer water. Thus, a two-dimensionally close-packed a particle monolayer F can be formed (a particle monolayer formation step).

As described above, when hydrophobic particles are selected, it is necessary to select a hydrophobic solvent. On the other hand, in this case, the lower-layer water must be hydrophilic and, typically, water is used, as described above. By combining the hydrophobic particles and solvent with the hydrophilic lower-layer water, the self-assembly of the particles (described later) is promoted and a two-dimensionally close-packed a particle monolayer F is formed. However, hydrophilic particles a hydrophilic solvent may also be used and, in this case, a hydrophobic liquid is selected as the lower-layer water.

Transfer Step

Figure 7B:
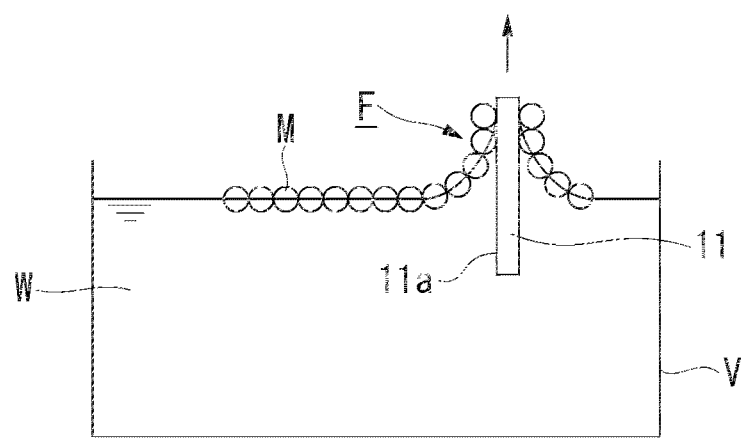
FIG. 7B is a cross-sectional schematic drawing schematically illustrating the transfer step in the method for manufacturing a mold for manufacturing the optical element of the present invention.

As illustrated in FIG. 7B, the a particle monolayer F that has been formed on the liquid surface in the a particle monolayer formation step is transferred onto the etching subject, namely the mold substrate 11 in the single-layer state as-is (transfer step). The mold substrate 11 may be flat, or a portion or entirety thereof may include a non-flat shape such as a curve, slope, step, or the like. It is possible to cover the substrate surface with the a particle monolayer F while maintaining the two-dimensionally close-packed state even if the mold substrate 11 is not flat. The specific method for transferring the a particle monolayer F to the mold substrate 11 is not particularly limited, and examples thereof include a method wherein the hydrophobic mold substrate 11 is lowered from above and put in contact with the a particle monolayer F while being held substantially perpendicular to the a particle monolayer F, and the a particle monolayer F is transferred to the mold substrate 11 by the affinity force between the hydrophobic a particle monolayer F and the mold substrate 11; and a method wherein the mold substrate 11 is disposed in a substantially horizontal direction in the lower-layer water in a water tank prior to forming the a particle monolayer F, and after the a particle monolayer F is formed on the liquid surface, the a particle monolayer F is transferred to the mold substrate 11 by gradually lowering the liquid level. The a particle monolayer F can be transferred to the mold substrate 11 without using special equipment by either of the above methods. However, the so-called LB trough method is preferably employed because even if the a particle monolayer F has a larger area, it is easily transferred to the mold substrate 11 while maintaining its two-dimensionally close-packed state (refer to Journal of Materials and Chemistry, Vol. 11, 3333 (2001), Journal of Materials and Chemistry, Vol. 12, 3268 (2002), and the like).

Through this transfer step, the plurality of particles M are arranged in substantially a monolayer on one surface, namely a flat surface 11a, of the mold substrate 11. That is, a a particle monolayer F of the particles M is formed on the flat surface 11a.

In the particle arrangement step, it is preferable that the plurality of particles M are arranged in a monolayer on the mold substrate 11 such that divergence D (%) of the arrangement defined by Formula (8) below is not greater than 10%.

[Formula 14]

$$D[\%]=|B-A|\times 100/A \qquad (8)$$

In Formula (8), A is the average particle size of the particles M, and B is the modal pitch between the particles M. Also, |B−A| indicates the absolute value of the difference between A and B.

It is preferable that the divergence D is from 1.0 to 3.0%.

Here, the average particle size A of the particles M is the average primary particle size of the particles M that constitute the a particle monolayer F, which can be determined by a commonly used method from the peak obtained by fitting the particle size distribution determined by particle dynamic light scattering to a Gaussian curve.

Meanwhile, the pitch between the particles M is the distance in a sheet plane direction from vertex to vertex of two adjacent particles M, and the modal pitch B is the average thereof. Note that when the particles M are spherical, the distance from vertex to vertex of adjacent particles M is equal to the distance from center to center of adjacent particles M.

As with the modal pitch P of the concave protrusions c1 to cn, specifically, the modal pitch B between, the particles M is determined as follows.

First, in a randomly selected region on the a particle monolayer F, an atomic force microscope image is obtained for a square region, parallel with the sheet plane, where one side thereof is from 30 to 40 times the modal pitch B between the particles M. For example, in the case of a a particle monolayer F that uses 300 nm particles M, an image of a region from 9 μm×9 μm to 12 μm×12 μm is obtained. Then, this image is subjected to waveform separation by Fourier transformation, and a fast Fourier transform image (FFT image) is obtained. Next, the distance from the zero-order peak to the first-order peak in the profile of the FFT image is determined. The reciprocal of the distance thus determined is the modal pitch $B_1$ in that region. This process is performed in the same manner for not less than a total of 25 randomly selected regions of the same area, and the modal pitches $B_1$ to $B_{25}$ in each region are determined. The average of the modal pitches $B_1$ to $B_{25}$ of the not less than 25 regions obtained in this manner is the modal pitch B in Formula (8). Note that, at this time, it is preferable that regions that are at least 1 mm apart are selected, and it is more preferable that regions that are from 5 mm to 1 cm apart from each other are selected.

Furthermore, at this time, variations in pitches between the particles M in each image can be evaluated from the area of the primary peak in the FFT image profile.

The divergence D of this arrangement is an indicator of the degree of close packing of the particles M. That is, a low divergence D of particle arrangement means that the degree of close packing is high, the gaps between particles are controlled, and the precision of their arrangement is high.

To ensure the divergence D (%) of the arrangement is not greater than 10%, the coefficient of variation of particle size of the particles M (value obtained by dividing the standard deviation by the average) is preferably not greater than 20%, more preferably not greater than 10%, and even more preferably not greater than 5%.

The pitch of the convex protrusions provided on the mold substrate 11 is equal to the modal pitch between the particles M. If the divergence D (%) of the arrangement is low, the pitch of the convex protrusions will be substantially the same as the average particle size A of the particles M. As such, the average particle size A of the particles M is appropriately selected so that convex protrusions with a desired pitch can be formed with high precision.

If particles M with a sufficiently low particle size coefficient of variation are used, the particles M can be easily arranged in the particle arrangement step so that the divergence D is not greater than 10%. That is, an etching mask constituted by a monolayer of close-packed particles M can be disposed on the mold substrate 11 with extremely high precision.

Etching Step

Figure 6B:
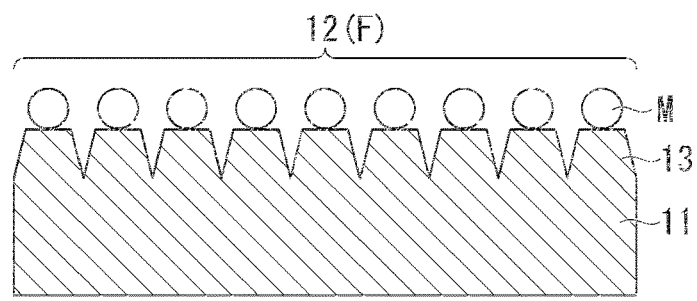
FIG. 6B is a cross-sectional schematic drawing schematically illustrating the method for manufacturing the optical element of the present invention.
Figure 6C:
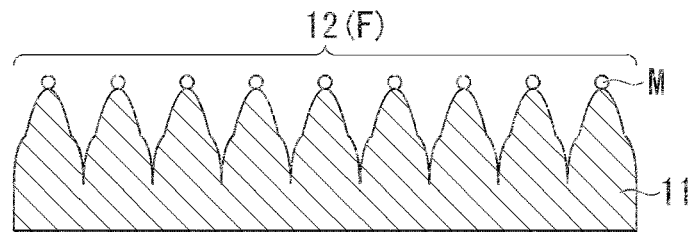
FIG. 6C is a cross-sectional schematic drawing schematically illustrating the method for manufacturing the optical element of the present invention.

The a particle monolayer F formed in the manner described above functions as a single particle etching mask 12. The mold substrate 11, for which the single particle etching mask 12 is provided on one surface, is subjected to surface processing by gas-phase etching (etching step) so as to form convex protrusions on one surface of the mold substrate 11. Specifically, upon initiation of the gas-phase etching, first, as illustrated in FIG. 6B, etching gas passes through the gaps between the particles M that constitute the etching mask 12 and reaches the surface of the mold substrate 11, so that grooves are formed in that portion, and round pillars 13 appear at the respective positions corresponding to the particles M. At this time, as a result of the gas-phase etching, the particles M on the round pillars 13 are gradually etched and become small. By continuing the gas-phase etching, the convex protrusions can be formed. By changing the etching conditions during the etching, the convex protrusions can be formed in a step shape (FIG. 6C). When the etching conditions are changed, the speed at which the particles M are etched changes, resulting in a change in the speed at which the mold substrate 11 is etched.

The particles M constituting the a particle monolayer etching mask 12 are not particularly limited, and examples thereof include gold particles, colloidal silica particles, and the like. A commonly used etching gas may be used. Examples thereof include Ar, $SF_6$, $F_2$, $CF_4$, $C_4F_8$, $C_5F_8$, $C_2F_6$, $C_3F_6$, $C_4F_6$, $CHF_3$, $CH_2F_2$, $CH_3F$, $C_3F_8$, $Cl_2$, $CCl_4$, $SiCl_4$, $BCl_2$, $BCl_3$, $BC_2$, $Br_2$, $Br_3$, HBr, $CBrF_3$, HCl, $CH_4$, $NH_3$, $O_2$, $H_2$, $N_2$, CO, $CO_2$, and the like.

The particles M and the etching gas may be changed in accordance with the mold substrate 11 to be etched. For example, in the case of a combination in which gold particles are selected as the particles constituting the a particle monolayer etching mask and a glass substrate is selected as the mold substrate, if an etching gas that reacts with glass such as $CF_4$, $CHF_3$, or the like is used, the etching rate of the gold particles will be relatively slower and the glass substrate will be selectively etched.

In the case of a combination in which colloidal silica particles are selected as the particles M constituting the a particle monolayer etching mask 12 and a PET substrate is selected as the substrate, the comparatively soft PET substrate can be selectively physically etched by using an inert gas such as Ar or the like as the etching gas.

By changing the etching gas during the gas-phase etching, the convex protrusions of the mold substrate can be formed in a step shape (FIG. 6C). For example, the etching rate can be changed and the convex protrusions can be formed by selecting Si as the mold substrate 11, performing etching with a composition including $Cl_2$ and $CF_4$ at a composition ratio of 50:50 to 100:0, and during the etching, changing the etching gas to a composition including $SF_6$ and $CH_2F_2$ at a composition ratio of 25:75 to 75:25. Etching conditions include an antenna power of 1,500 W, a bias power of from 50 W to 300 W, and a gas flow rate of from 30 sccm to 50 sccm.

Typically, when the electric field bias is set to from tens to hundreds of watts, the positively charged particles in the etching gas that is in a plasma state accelerate and impact the substrate substantially vertically at a high speed. As such, when a gas is used that reacts with the substrate, physicochemical etching in the vertical direction occurs.

Meanwhile, while dependent on the combination of the material of the substrate and the type of etching gas, with gas-phase etching, isotropic etching by the radicals produced by the plasma occurs in parallel. The etching by the radicals is chemical etching, in which isotropic etching occurs in all directions of the etching subject.

The etching rate cannot be controlled by setting the bias power because radicals do not carry an electric charge, but the etching rate can be controlled by adjusting the concentration (flow rate) of the etching gas in the chamber. As such, the proportions of vertical etching and isotropic etching can be controlled by changing the concentration (flow rate) of the etching gas in the chamber and, as a result, the convex protrusions can be formed with a step shape.

Figure 6D:
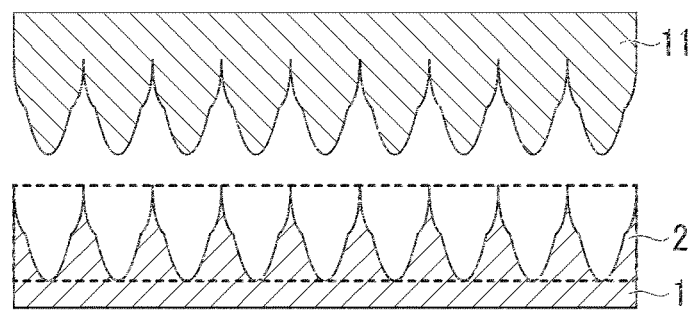
FIG. 6D is a cross-sectional schematic drawing schematically illustrating the method for manufacturing the optical element of the present invention.

To this point, a method for fabricating a mold provided with convex protrusions that have a step shape, using the a particle monolayer etching mask 12, has been described. As illustrated in FIG. 6D, the optical element in which the concave protrusions are formed in the anti-reflection layer 2 can be obtained by transferring from this mold (transfer an odd number of times). The transferred product (the anti-reflection layer having the concave protrusions) is formed on a 1-for-1 basis with the mold and, as such, the pitch of the concave protrusions formed in the anti-reflection layer is equal to the pitch of the convex protrusions of the mold substrate 11, and displacements and the like in the arrangement of the concave protrusions formed in the anti-reflection layer match the mold.

The method for fabricating the mold is not limited to the method described above. For example, instead of the a particle monolayer etching mask, a photoresist mask in which a pattern is formed by interference exposure may be used. By changing the processing voltage in the aluminum anodization, a mold having a corresponding convex shape can be fabricated. In this case, the anti-reflection layer having concave protrusions can be fabricated by transferring from the mold an even number of times.

Examples of the transfer method described above include injection molding in which fluid material is poured into a mold and, thereafter, the surface shape of the mold surface is transferred by solidifying the material; so-called nanoimprinting in which the surface shape is transferred by pressing a mold into resin or a glass material; and the like.

The mold obtained through the method described above has any one of the following characteristics [1] to [3].

[1] A mold comprising a plurality of fine convex protrusions having a modal pitch less than or equal to a wavelength of light in an environment where the mold is to be used; wherein 80% or more of the convex protrusions include one or more steps and satisfy the following conditions:

[Formula 15]

$$0.12 d_m \leq w_t \leq 0.17 d_m \quad (20)$$

(wherein $d_m$ is the diameter of the convex protrusions and $w_t$ is the total width of the steps in any cut surface).

[2] A mold comprising a plurality of fine convex protrusions having a modal pitch less than or equal to a wavelength of light in an environment where the mold is to be used; wherein 80% or more of the convex protrusions include two or fewer steps and satisfy the following conditions:

[Formula 16]

$$0.10 d_m \leq w_t \leq 0.20 d_m \quad (21)$$

(wherein $d_m$ is the diameter of the convex protrusions and $w_t$ is the total width of the steps in any cut surface).

[3] A mold comprising a plurality of fine convex protrusions having a modal pitch less than or equal to a wavelength of light in an environment where the mold is to be used; wherein 80% or more of the convex protrusions include one step and satisfy the following conditions:

[Formula 17]

$$0.09 d_m \leq w_t \leq 0.15 d_m \quad (22)$$

(wherein $d_m$ is the diameter of the convex protrusions and $w_t$ is the total width of the steps in any cut surface).

Figure 12:
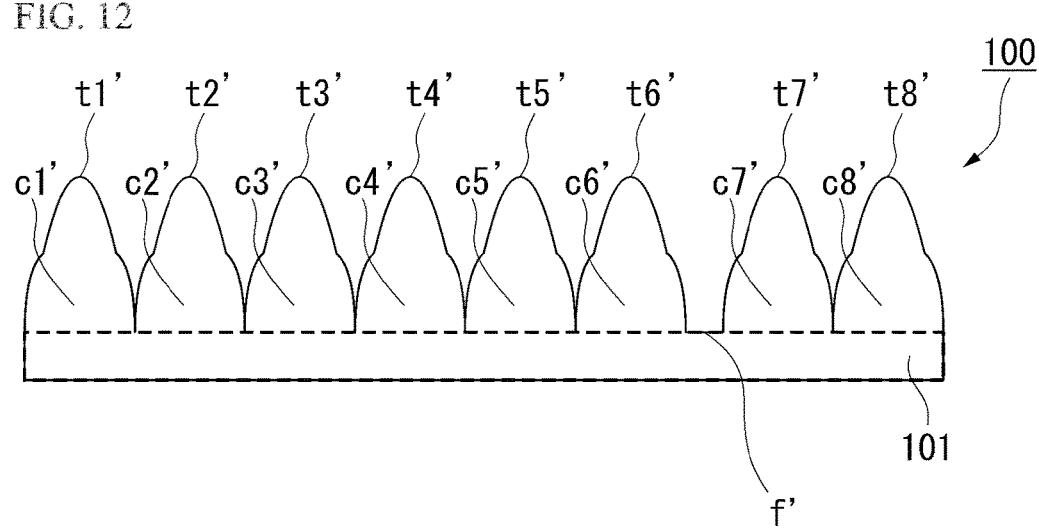
FIG. 12 is a drawing schematically illustrating a cross-section of a mold for fabricating the optical element of the present invention.

FIG. 12 is a drawing schematically illustrating a cross-section of the mold. A mold 100 includes a substrate 101 and a plurality of convex protrusions c1' to cn'. The mold 100 may include a flat portion f' corresponding to the flat portion f in FIG. 1.

The proportion of the convex protrusions that include steps is determined as follows. A cross-section along a line having a length of 5 μm in any direction and at any position such as that illustrated in FIG. 12 is obtained from an AFM image of the mold 100 or a microscope image obtained by actually cutting the mold. The cross-section is a plane perpendicular to the arrangement plane on which the convex protrusions are arranged. In cases where the convex protrusions are systematically arranged, it is preferable that a direction along the arrangement direction of the convex protrusions is used as the cutting direction to obtain the cross-section.

Any portion in which 30 to 40 or more convex protrusions are included in the cross-section is extracted, and the proportion of convex protrusions that include steps is calculated for the convex protrusions included in the extracted portion.

Similar to the peaks of the concave protrusions t1' to tn', the diameter $d_m$ can be found as the maximum diameter of the convex protrusions observed in the cross-section perpendicular to the arrangement plane of the convex protrusions.

The procedure described for the definition of the width of the steps in the optical element 10 can be applied to the definition of the width $w_t$ of the steps in the mold 100.

The heights at which the steps are provided in, the convex surface of the mold 100 are adjusted so that the concave protrusions of the optical element of the present invention have steps at the predetermined positions.

In injection molding or imprinting using a mold, the depth at which the steps in the concave protrusion surface of the optical element are formed change depending on the transfer conditions and material. As such, it is preferable that transfer tests be performed using a plurality of prototype molds with different step positions and the mold and transfer conditions be optimized so that the optical element of the present invention can be manufactured with high accuracy.

EXAMPLES

The antireflective performance of the optical element of the present invention was confirmed by simulation. First, the simulation method will be described (refer to Applied Optics, Vol. 26, No. 6 1142-1146 (1987), Applied Optics, Vol. 32, No. 7 1154-1167 (1993), and the like).

Reflection when light enters an interface between a material with a refractive index of, $n_o$ and a material with a refractive index of $n_s$ will be considered. Here, an article with the refractive index $n_s$ has a concave shape such as that illustrated in FIG. 8.

Figure 8:
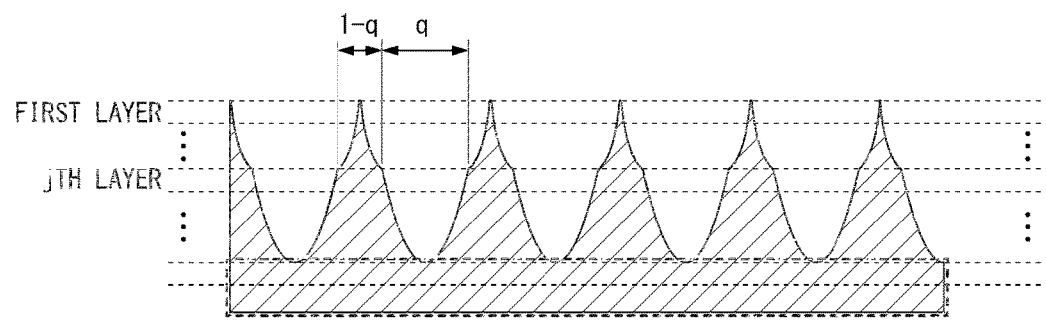
FIG. 8 is a cross-sectional schematic drawing for explaining a simulation method.

First, as illustrated in FIG. 8, the anti-reflection layer of the concave protrusions is sliced so as to divide it into N layers from the reference point side, so as to form a layered structure having a first layer to an Nth layer, in, order from the reference point side. The jth layer consists of repetitions of an air region with a width q and an anti-reflection, layer region with a width 1−q. The width here is the width of the interface with the j−1th layer. The effective refractive index of the jth layer, is $n_j$, and the thickness of this layer is $d_j$. Here, $n_j$ can be found from the refractive indexes $n_o$ and $n_s$, and the width q. Additionally, $dj_j$ can be found by dividing the modal depth of the concave protrusions by the number of layers N.

The transfer matrix shown in Formula (9) below is calculated. In the calculation, it is assumed that light of a wavelength λ enters the jth layer at an angle of incidence $φ_j$.

[Formula 18]

$$T_j = \begin{bmatrix} \cos\delta_j & (i/\omega_j)\sin\delta_j \\ i\omega_j\sin\delta_j & \cos\delta_j \end{bmatrix} \quad (9)$$

Here, $\delta_j$ and $\omega_j$ are represented by Formula (10) and Formula (11) below.

[Formula 19]

$$\delta_j = (2\pi/\lambda)n_j d_j \cos\phi_j \quad (10)$$

[Formula 20]

$$\omega_j = \begin{cases} n_j \cos\phi_j & (s \text{ polarization}) \\ n_j/\cos\phi_j & (p \text{ polarization}) \end{cases} \quad (11)$$

Following the order in which the light passes through the layers, the multiplying of the transfer matrix of each layer from the left is repeated from the first layer to the Nth layer. This operation can be represented by Formula (12). Note that in Formula (12), A, B, C, and D are values of the calculated results.

[Formula 21]

$$\prod_{j=1}^{N} T_j = \begin{pmatrix} A & B \\ C & D \end{pmatrix} \quad (12)$$

Using A, B, C, and D that were calculated using the procedure described above, the reflectance of the plurality of sliced layers can be represented as follows.

[Formula 22]

$$R = \left| \frac{\omega_0 A + \omega_0 \omega_s B - C - \omega_s D}{\omega_0 A + \omega_0 \omega_s B + C + \omega_s D} \right|^2 \quad (13)$$

Example 1

Using concave protrusions that include one step, the average reflectance was calculated while changing the total width $w_s$ of the steps and the average depth $z_s$ of the steps. Here, the depth h of the concave protrusions was 295 nm (average), the modal pitch P was 120 nm, and the diameter d was 120 nm (average). Light entered an interface with a refractive index of 1.5 from air with a refractive index of 1.0, at an angle of incidence of 5°, and the refractive index of the material of the anti-reflection layer was also 1.5. The results are shown in FIG. 13.

The average reflectance was calculated as follows. First, the reflectance of the light that has entered the interface when projecting light of a wavelength of 380 nm at an angle of incidence of 5° was calculated using Formula (13). Then, the reflectance of light that has entered the interface for of every 20 nm up to a wavelength of 780 nm was calculated. The average of the reflectance of the light wavelengths was calculated and recorded as the average reflectance.

Figure 13:
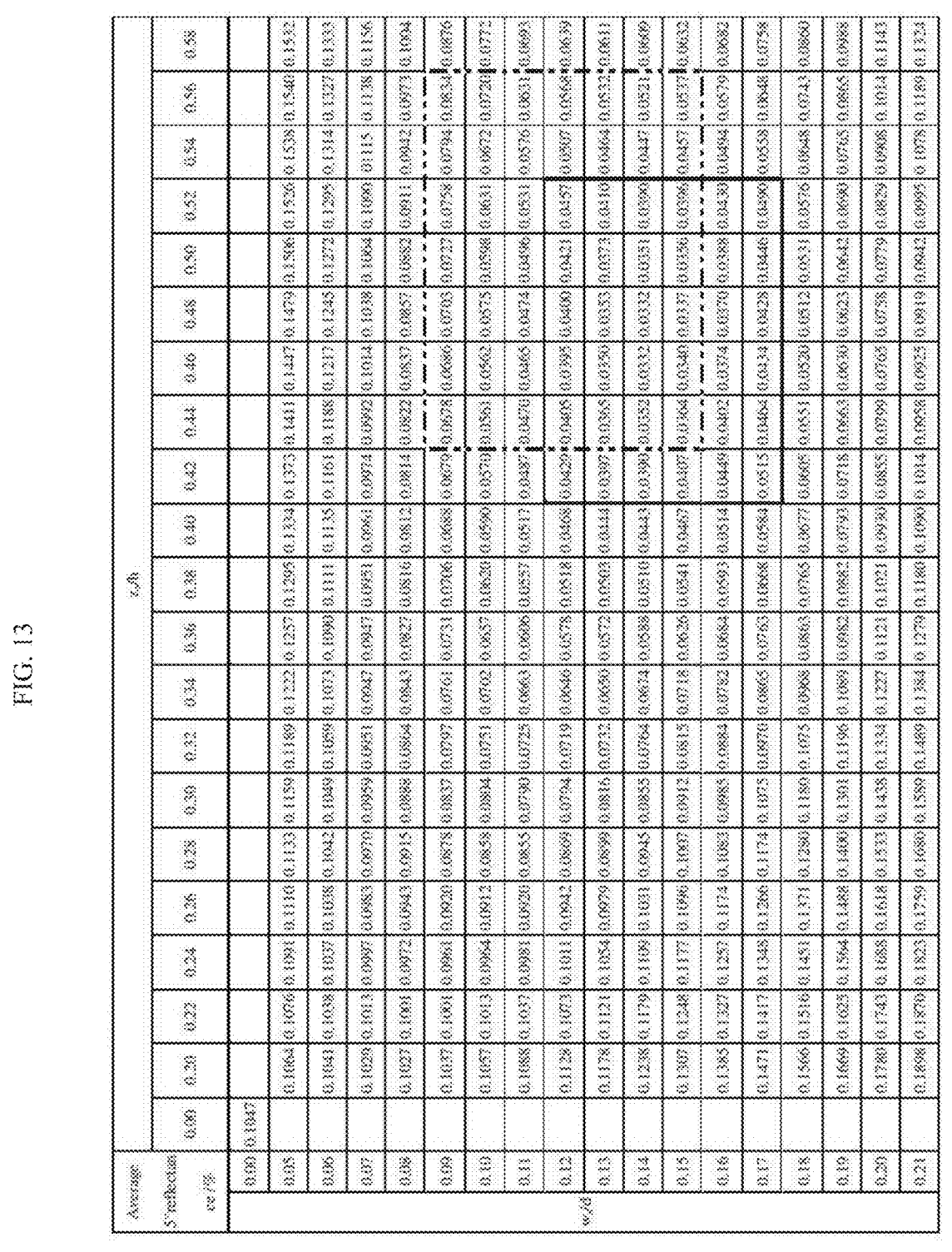

In FIG. 13, cases where the total width $w_s$ of the steps was 0 and the average depth $z_s$ of the steps was 0 indicate the average reflectance of a case where no steps were provided. Average depths $z_s$ closer to 0 indicate the presence of a step closer to the reference point, and larger average depths $z_s$ indicate the presence of a step on the deepest point side. The region surrounded by the bold line in FIG. 13 shows a region of average reflectance where the reflectance is half or less than the average reflectance of a case where there are no steps.

It is clear that the region satisfying $0.12d \leq w_s \leq 0.17d$ and $0.42h \leq z_s \leq 0.52h$ has extremely excellent antireflective performance as the average reflectance are half or less compared to the average reflectance of a case where there are no steps (0.1047).

Example 2

Figure 14:
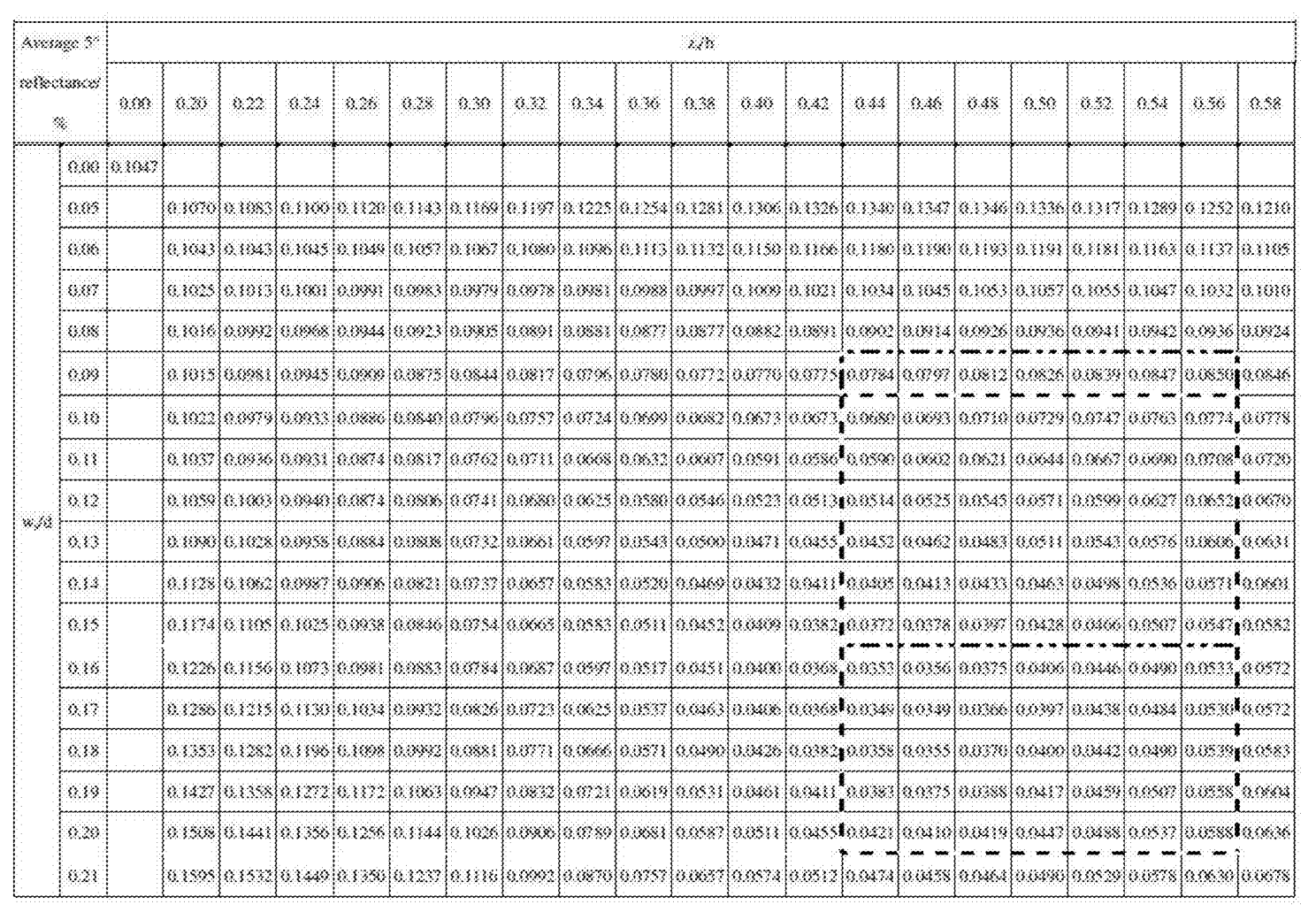

Using concave protrusions that include two steps, as in Example 1, the average reflectance was calculated while changing the total width $w_s$ of the steps and the average depth $z_s$ of the steps. Here, a configuration was used in which, as a typical example, the two steps were present at positions of 0.75a and 1.25a where $z_s$=a. That is, for example, when $z_s$=0.40h, the two steps were present at positions of 0.30h and 0.50h. The lateral width of each of the steps was $w_s$/4 and the vertical width was 0.1h/2. The results are shown in FIG. 14. Here, the calculation conditions of the depth, modal pitch, diameter, and reflectance of the concave protrusions were the same as in Example 1.

Example 3

Figure 15:
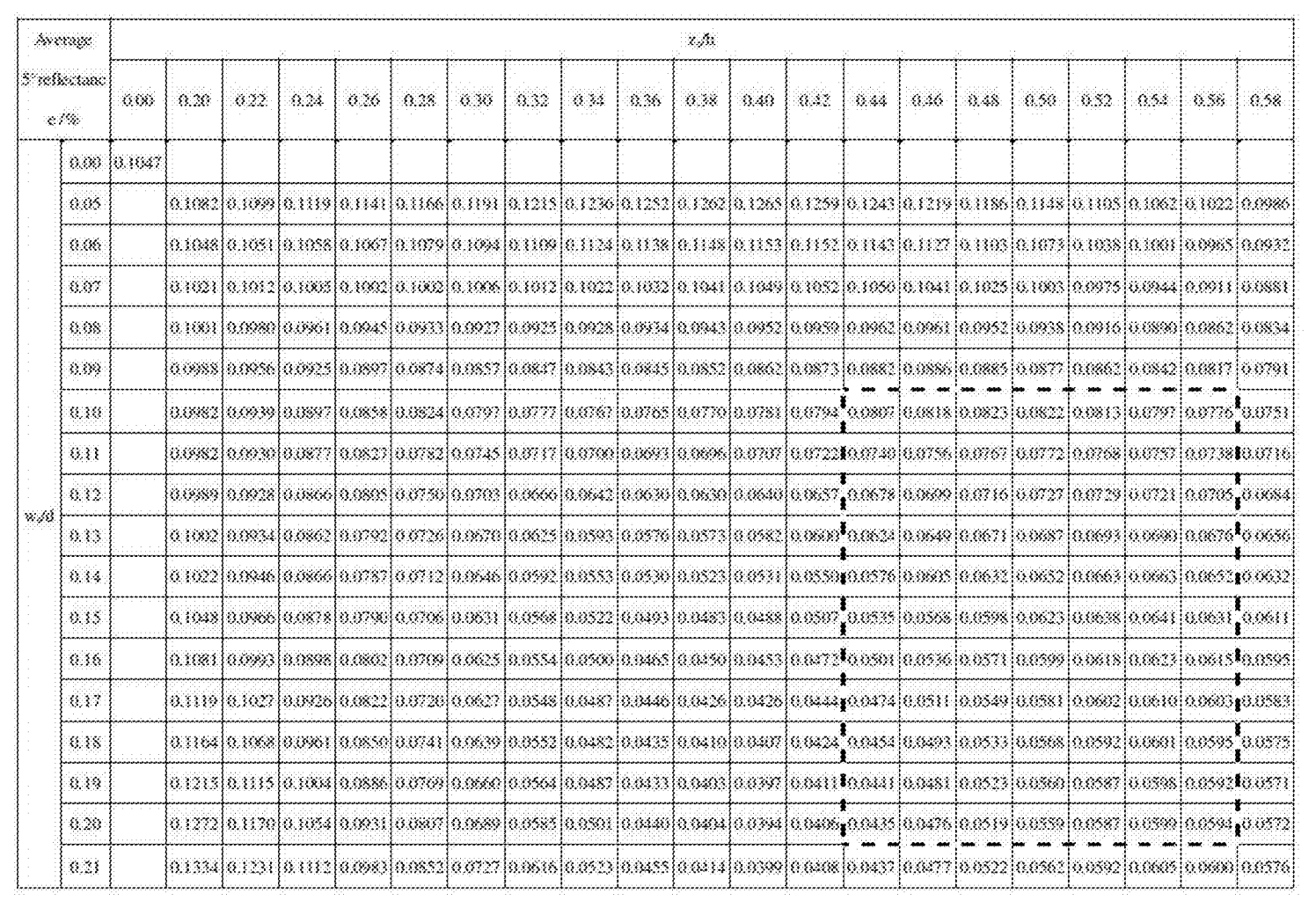

Using concave protrusions that include three steps, as in Example 1, the average reflectance was calculated while changing the total width $w_s$ of the steps and the average depth $z_s$ of the steps. Here, a configuration was used in which, as a typical example, the three steps were present at positions of 0.5a, 1.0a, and 1.5a where $z_s$=a. That is, for example, when $z_s$=0.40h, the three steps were present at positions of 0.20h, 0.40h, and 0.60h. The lateral width of each of the steps was $w_s$/6 and the vertical width was 0.1h/3. The results are shown in FIG. 15. Here, the calculation conditions of the depth, modal pitch, diameter, and reflectance of the concave protrusions were the same as in Example 1.

The average reflectance at the same $w_s$ and $z_s$ in FIG. 14 and FIG. 15 are compared. It is clear that, in the regions surrounded by the dot-dash lines in FIG. 14 and FIG. 15, the average reflectance of FIG. 14 are lower than the average reflectance of FIG. 15. That is, in this range, the average reflectance is lower for cases with two steps (FIG. 14) than for cases with three steps (FIG. 15).

In other words, in the range $0.10d \leq w_s \leq 0.20d$ and $0.44h \leq z_s \leq 0.56h$, from the standpoint of the average reflectance, cases where there are two steps are superior to cases where there are three steps. Therefore, the number of steps can be set to be two or fewer.

Likewise, the average reflectance at the same $w_s$ and $z_s$ in FIG. 13 and FIG. 14 are compared. It is clear that, in the regions surrounded by the dot-dash lines in FIG. 13 and FIG. 14, the average reflectance of FIG. 13 are lower than the average reflectance of FIG. 14. That is, in this range, the average reflectance is lower for cases with one step (FIG. 13) than for cases with two steps (FIG. 14).

In other words, in the range $0.09d \leq w_s \leq 0.15d$ and $0.44h \leq z_s \leq 0.56h$, from the standpoint of the average reflectance, cases where there is one step are superior to cases where there are two steps. Therefore, the number of steps can be set to one.

Example 4

Next, the average reflectance was calculated while changing the shape of the envelope of the concave protrusions. The shape of the concave protrusions was changed by changing the depth of the concave protrusions and width $d_{3/4}$ of the concave protrusions at a depth of ¾h from the reference plane including the reference point.

Figure 16:
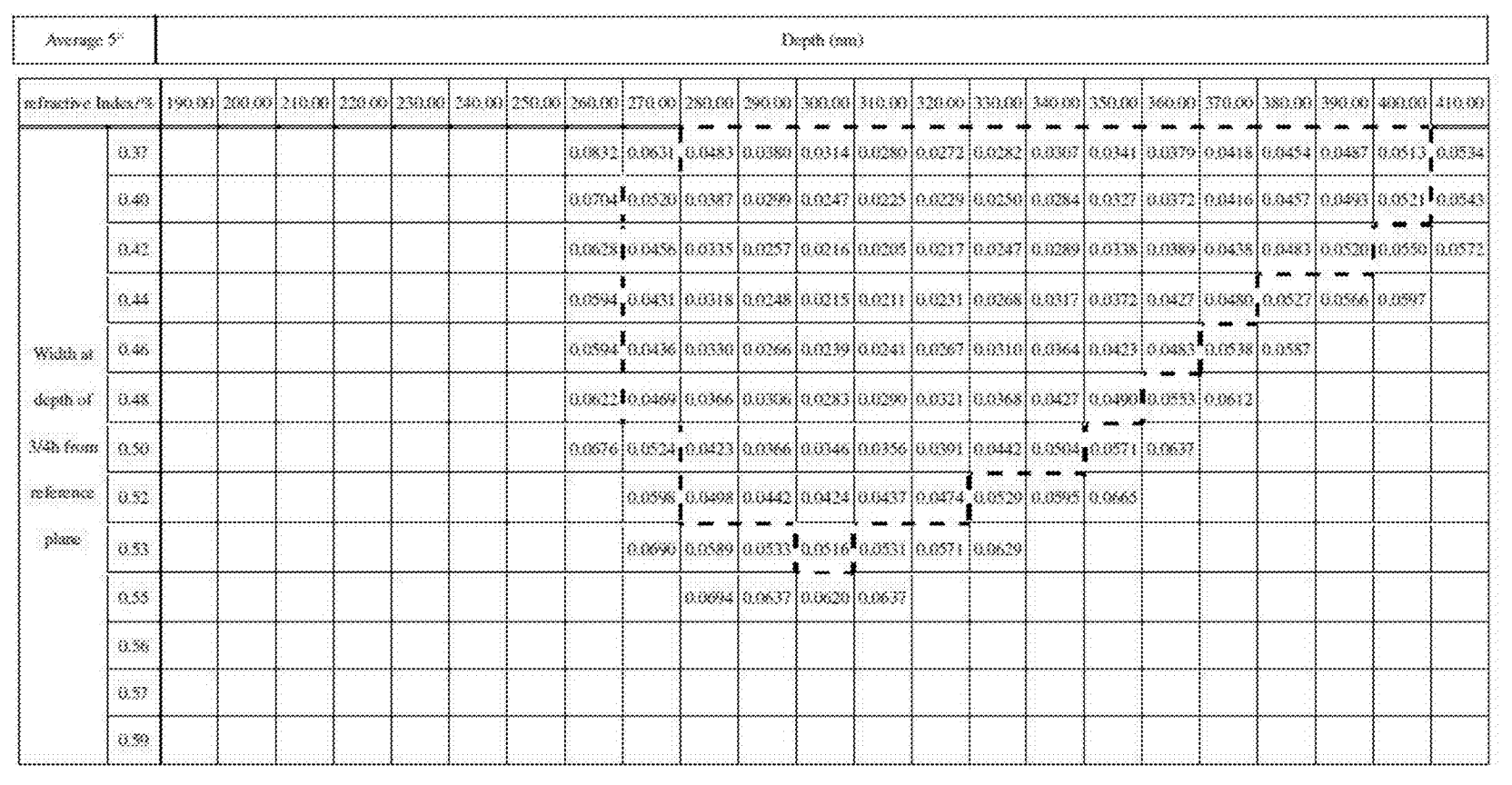

The concave protrusions were provided with one step, the total width $w_s$ of the steps was fixed at 0.14d, and the average depth position $z_s$ of the steps was fixed at 0.48h. Additionally, the modal pitch P of the concave protrusions was 90 nm and the diameter d was 90 nm (average). Light entered an interface with a refractive index of 1.5 from air with a refractive index of 1.0, at an angle of incidence of 5°, and the refractive index of the material of the anti-reflection layer was also 1.5. The results are shown in FIG. 16. The rows in FIG. 16 are proportions of the width $d_{3/4}$ of the concave protrusions at a depth of ¾h from the reference plane including the reference point, with respect to the diameter d of the concave protrusions.

Example 5

Figure 17:
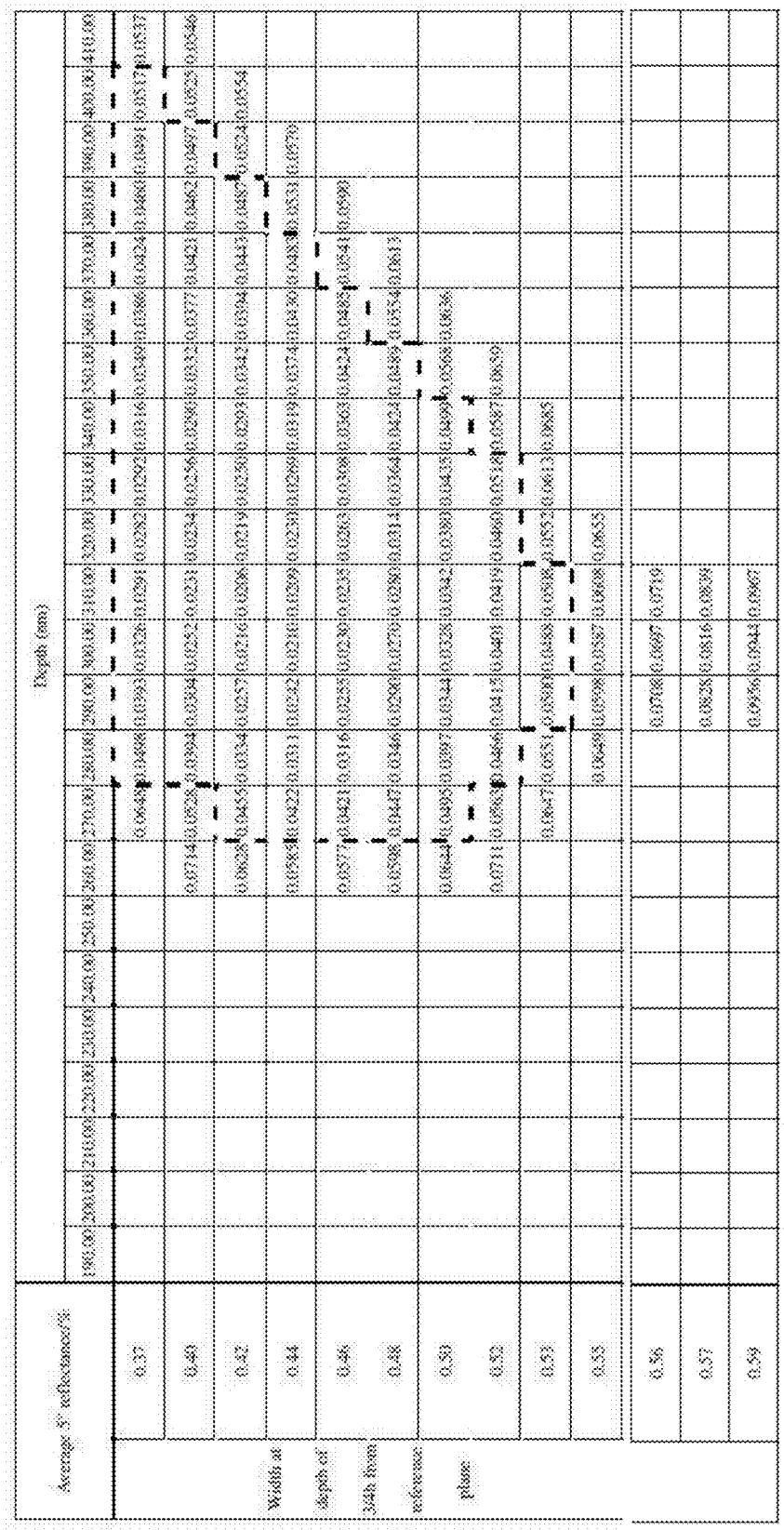
FIG. 17 is a table wherein rows are proportions of the width $d_{3/4}$ of the concave protrusions at a depth of ¾ h from the reference plane including the reference point, with respect to the diameter d of the concave protrusions. Additionally, the modal pitch P of the concave protrusions was 120 nm and the diameter d was 120 nm (average).

Other than setting the modal pitch of the concave protrusions to 120 nm and the diameter to 120 nm (average), the average reflectance was calculated in the same manner as in Example 4. The results are shown in FIG. 17. The rows in FIG. 17 are proportions of the width $d_{3/4}$ of the concave protrusions at a depth of ¾h from the reference plane, with respect to the diameter d of the concave protrusions.

Example 6

Figure 18:
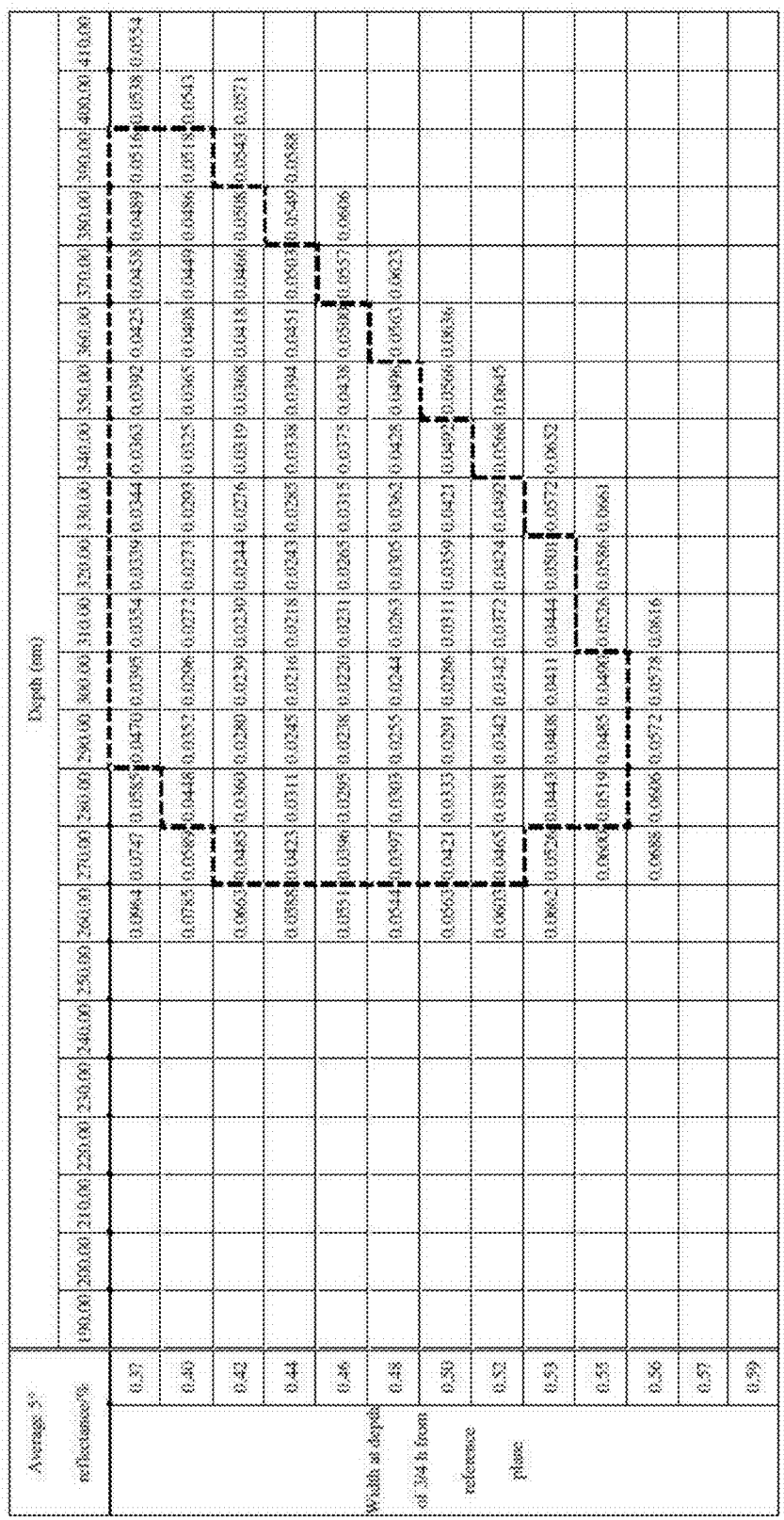
FIG. 18 is a table wherein rows are proportions of the width d of the concave protrusions at a depth of ¾ h from the reference plane including the reference point, with respect to the diameter d of the concave protrusions. Additionally, the modal pitch P of the concave protrusions was 200 nm and the diameter d was 200 nm (average).

Other than setting the modal pitch of the concave protrusions to 200 nm and the diameter to 200 nm (average), the average reflectance was calculated in the same manner as in Example 4. The results are shown in FIG. 18. The rows in FIG. 18 are proportions of the width $d_{3/4}$ of the concave protrusions at a depth of ¾h from the reference plane, with respect to the diameter d of the concave protrusions.

In FIGS. 16 to 18, the range surrounded by the dot-dash lines indicate average reflectance that are half or less than the average reflectance of a case where there are no steps (0.1047). These cases have high antireflective performance. The shape of the envelope when the average reflectance is in this range is understood to be conical from the relationship between the depth of the concave protrusions and the width $d_{3/4}$ of the concave protrusions at a depth of ¾h from the reference plane.

Example 7

The change in the average reflectance due to the wavelength of incident light was calculated.

The concave protrusions were provided with one step, the total width $w_s$ of the steps was fixed at 0.14d, and the average depth $z_s$ of the steps was fixed at 0.48h. Additionally, the modal pitch P of the concave protrusions was 120 nm and the diameter d was 120 nm. Light entered an interface with a refractive index of 1.5 from air with a refractive index of 1.0, at an angle of incidence of 5°, and the refractive index of the material of the anti-reflection layer was also 1.5.

Figure 9:
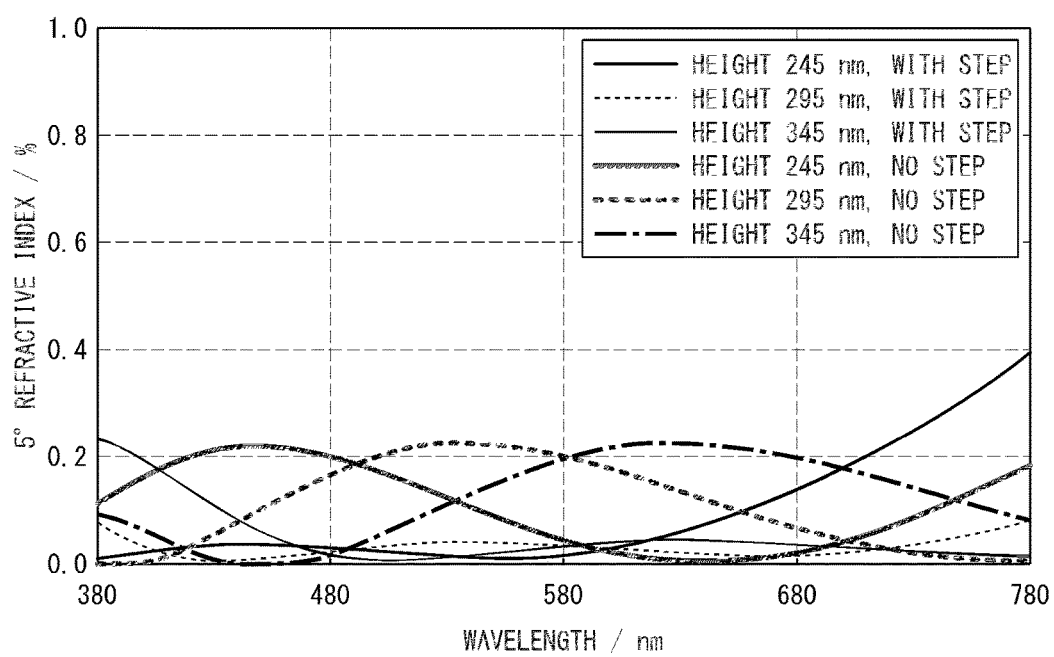
FIG. 9 is a graph showing results of simulations for cases where wavelengths in the visible light region enter the optical element of the present invention.
Figure 10:
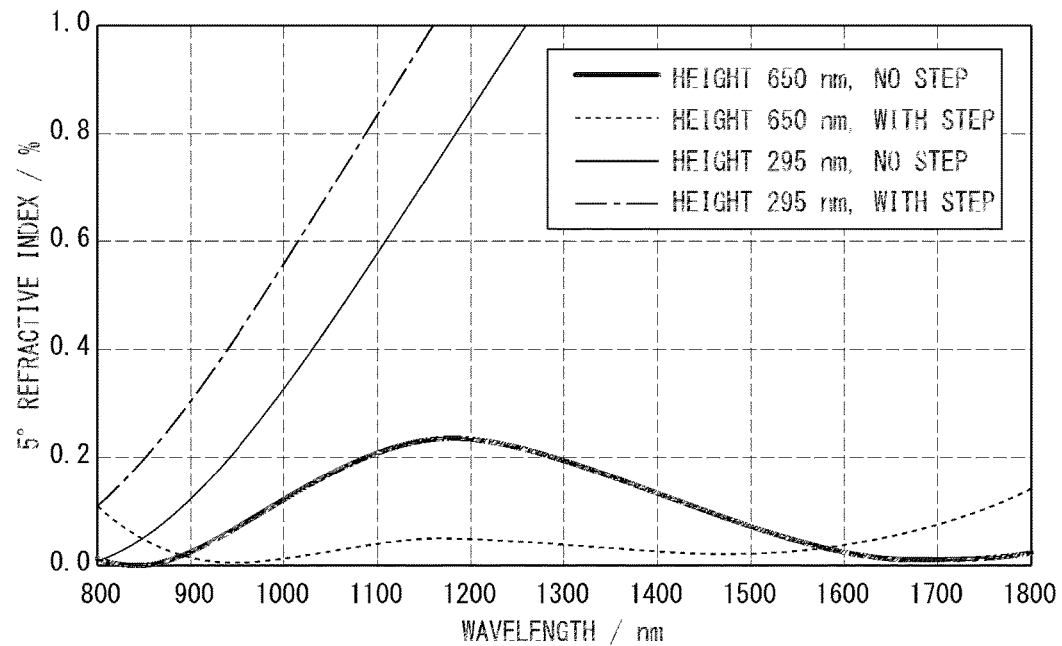
FIG. 10 is a graph showing results of simulations for cases where wavelengths in the near infrared region enter the optical element of the present invention.
Figure 11:
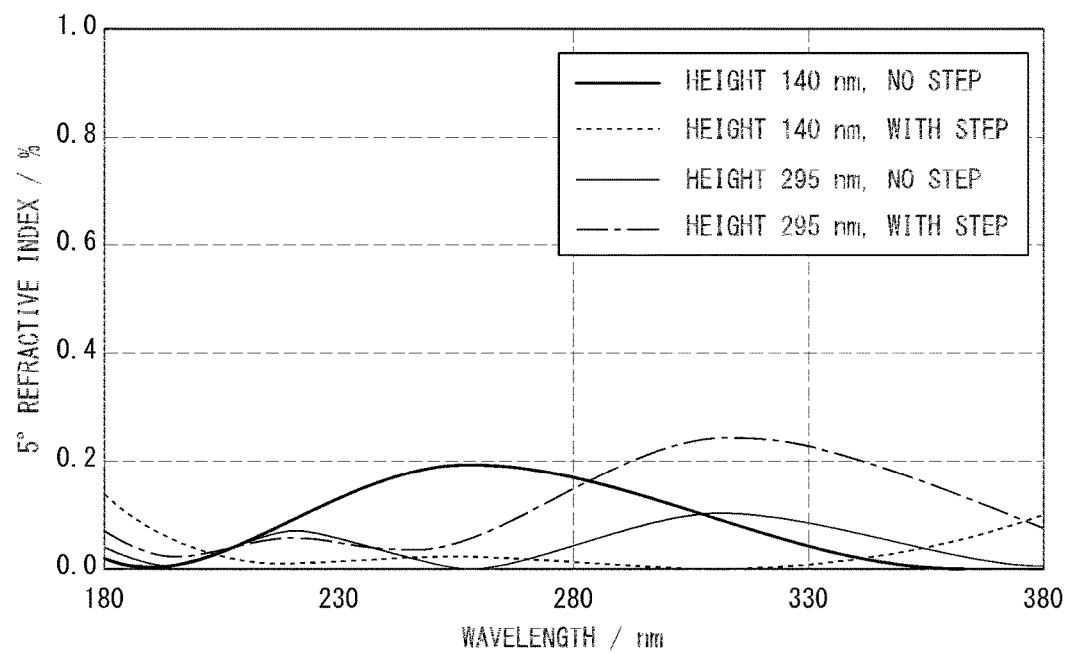
FIG. 11 is a graph showing results of simulations for cases where wavelengths in the near ultraviolet region enter the optical element of the present invention.

Results for entrance of wavelengths in the visible light region are shown in FIG. 9, results for entrance of light of a wavelength in the near infrared region are shown in FIG. 10, and results for entrance of light of a wavelength in the near ultraviolet region are shown in FIG. 11.

In FIG. 9, change in the average reflectance of the concave protrusions was calculated for cases where the modal depth of the concave protrusions was 245 nm, 295 nm, and 345 nm. For comparison, change in the average reflectance of the concave protrusions was also calculated for a case where there were no steps and the modal depth of the concave protrusions was 245 nm, 295 nm, and 345 nm. From this comparison, it is clear that particularly high antireflective performance is displayed when the modal depth is from 45% to 55% of the median of the wavelength range of the incident light. Specifically, extremely high antireflective performance is displayed when the modal depth of the concave protrusions is 295 nm with respect to visible light of 380 nm to 780 nm.

In FIG. 10, change in the average reflectance of the concave protrusions was calculated for cases where the modal depth of the concave protrusions was 295 nm and 650 nm. For comparison, change in the average reflectance of the concave protrusions was also calculated for a case where there were no steps and the modal depth of the concave protrusions was 295 nm and 650 nm. From FIG. 10, even when near infrared light enters, it is clear that particularly high antireflective performance is displayed when the modal depth is from 45% to 55% of the median of the wavelength range of the incident light.

In FIG. 11, change in the average reflectance of the concave protrusions was calculated for cases where the modal depth of the concave protrusions was 140 nm and 295 nm. For comparison, change in the average reflectance of the concave protrusions was also calculated for a case where there were no steps and the modal depth of the concave protrusions was 140 nm and 295 nm. From FIG. 11, even when near ultraviolet light enters, it is clear that particularly high antireflective performance is displayed when the modal depth is from 45% to 55% of the median of the wavelength range of the incident light.

REFERENCE SIGNS LIST

1 Substrate
2 Anti-reflection layer
c1 to cn Convex protrusions
t1 to tn Central points
m1 to m7 Midpoints
f Flat portion
$C_1$ to $C_n$ Areas
u Circle
11 Mold substrate
12 A particle monolayer etching mask
F A particle monolayer
13 Round pillar
M Particle
V Water tank
W Water

The invention claimed is:

1. An optical element comprising: on a substrate, an anti-reflection layer on which a plurality of small concave protrusions, which have a modal pitch less than or equal to a wavelength of light in an environment where the optical element is to be used, are formed, wherein 80% or more of the concave protrusions have one step, and satisfy the following conditions:

$$0.09d \leq w_s \leq 0.15d \tag{5}$$

$$0.44h \leq z_s \leq 0.56h \tag{6}$$

wherein d is a maximum diameter of the concave protrusions observed in any cross-section including 30 to 40 or more concave protrusions, h is a difference in height between a deepest point and a highest portion of the concave protrusions observed in the cross-section including 30 to 40 or more concave protrusions, $w_s$ is an average value of a total width of the step of each concave portion observed in the cross-section including 30 to 40 or more concave protrusions; and $z_s$ is an average depth of the step, wherein the modal pitch is a distance between adjacent concave protrusions obtained by a reciprocal of a distance from a zero-order peak to a first-order peak in a profile of a fast Fourier transform (FFT) image.

2. The optical element according to claim 1, wherein a modal depth which is an average depth of 30 to 40 or more concave protrusions in the cross-section including 30 to 40 or more concave protrusions is in a range of 45 to 55% of a median of a wavelength range of light in an environment in which the optical element is to be used.

3. The optical element according to claim 1, wherein an envelope of the concave protrusions including the step is conical.

4. The optical element according to claim 1, further comprising:
  a plurality of areas continuously arranged in a positional relationship where a central point of seven of the concave protrusions that are adjacent is an intersection point of diagonal lines of six vertices of a regular hexagon,
  wherein areas and shapes of the plurality of areas are random, and a six straight lines which are drawn connecting any concave protrusion in any area of the plurality of areas are at an angle of not less than 3 degrees with respect to a straight line which is drawn connecting central points of any two adjacent concave protrusions in an area adjacent to the area.

5. The optical element according to claim 1, wherein:
  80% or more of the concave protrusions have one step, and satisfy the following conditions:

$0.12d \leq ws \leq 0.15d$ $0.44h \leq zs \leq 0.52h.$

* * * * *